United States Patent
Shahine et al.

(10) Patent No.: US 10,924,931 B2
(45) Date of Patent: Feb. 16, 2021

(54) EXTERNAL SHARING WITH IMPROVED SECURITY

(71) Applicant: Microsoft Technology Licensing, LLC, Redmond, WA (US)

(72) Inventors: Omar H. Shahine, Seattle, WA (US); Greg S. Friedman, Redmond, WA (US); Eugene S. Lin, Seattle, WA (US); Rafael Lopez-Uricoechea, Seattle, WA (US); Sean Lamont Grant Livingston, Bothell, WA (US); Hui Huang, Bellevue, WA (US); Gang Zhai, Bellvue, WA (US); Michael Scott Pierce, Seattle, WA (US); Sarat Chandra Subramaniam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

(21) Appl. No.: 15/604,084

(22) Filed: May 24, 2017

(65) Prior Publication Data
US 2018/0343243 A1   Nov. 29, 2018

(51) Int. Cl.
*H04L 29/06* (2006.01)
*H04W 12/08* (2021.01)
(Continued)

(52) U.S. Cl.
CPC ............ *H04W 12/08* (2013.01); *G06F 21/10* (2013.01); *G06F 21/6218* (2013.01);
(Continued)

(58) Field of Classification Search
CPC .......... G06F 21/24; G06F 21/62; G06F 21/31; G06F 21/10; G06F 17/30014;
(Continued)

(56) References Cited

U.S. PATENT DOCUMENTS 7,043,230 B1 * 5/2006 Geddes ............... H04L 63/18
                                              455/410
7,784,087 B2   8/2010 Yami et al.
(Continued)

OTHER PUBLICATIONS

"Manage external sharing for your SharePoint Online environment—Office Support", https://support.office.com/en-us/article/Manage-external-sharing-for-your-SharePoint-Online-environment-c8a462eb-0723-4b0b-8d0a-70feafe4be85, Retrieved on: Mar. 23, 2017, 15 pages.

(Continued)

*Primary Examiner* — Saleh Najjar
*Assistant Examiner* — Khalid M Almaghayreh
(74) *Attorney, Agent, or Firm* — Christopher J. Volkmann; Kelly, Holt & Christenson, PLLC

(57) ABSTRACT

A computing system includes a processor and memory storing instructions executable by the at least one processor. The instructions, when executed, provide a user interface component that receives an indication of an external user with which to share an item of electronic content, a link generation component that generates a link to share the item of electronic content and identifies a communication endpoint associated with the external user, and an access control component that receives a request to access the item of electronic content using the link and, in response to the request, generates an access code that is communicated to the communication endpoint associated with the external user. The user interface component receives an access input, and the access control component grants access to the item of electronic content based on a determination that the access input includes the access code communicated to the communication endpoint associated with the external user.

20 Claims, 25 Drawing Sheets

(51) Int. Cl.
 *G06F 21/62* (2013.01)
 *H04L 12/58* (2006.01)
 *G06F 21/10* (2013.01)

(52) U.S. Cl.
 CPC ............ *H04L 51/12* (2013.01); *H04L 63/083* (2013.01); *H04L 63/10* (2013.01); *H04L 63/20* (2013.01)

(58) Field of Classification Search
 CPC ...... G06F 17/2235; G06F 17/30; G06F 17/22; H04L 63/0492; H04L 63/083; H04L 63/102; H04L 63/08; H04L 29/06; H04L 29/08
 USPC .................. 726/5, 17, 27–29; 707/608, 627; 713/182–184
 See application file for complete search history.

(56) References Cited

U.S. PATENT DOCUMENTS

| | | | |
|---|---|---|---|
| 7,966,375 | B2 | 6/2011 | Steele |
| 8,176,334 | B2 | 5/2012 | Vainstein |
| 8,353,018 | B2 | 1/2013 | McMillan et al. |
| 8,930,469 | B2 | 1/2015 | Schechter et al. |
| 9,053,342 | B2 | 6/2015 | Odnovorov et al. |
| 9,185,086 | B1 | 11/2015 | Talati |
| 9,264,480 | B1* | 2/2016 | Saylor .................. H04L 63/104 |
| 9,294,485 | B2 | 3/2016 | Allain et al. |
| 9,344,433 | B2* | 5/2016 | Adams .................. G06Q 10/101 |
| 9,384,337 | B1 | 7/2016 | Sirbu et al. |
| 9,396,349 | B1 | 7/2016 | Berfeld et al. |
| 9,509,667 | B2 | 11/2016 | Pigin |
| 9,519,888 | B2 | 12/2016 | Gadwale |
| 9,565,175 | B1* | 2/2017 | Saylor ................. G06F 21/6218 |
| 9,600,669 | B2 | 3/2017 | Filman et al. |
| 9,613,190 | B2* | 4/2017 | Ford ........................ G06F 21/62 |
| 9,807,073 | B1* | 10/2017 | Miller ..................... H04L 63/08 |
| 9,948,627 | B1* | 4/2018 | Cassar .................. H04L 63/168 |
| 10,015,155 | B2 | 7/2018 | Filman et al. |
| 2003/0225834 | A1 | 12/2003 | Lee et al. |
| 2005/0086126 | A1 | 4/2005 | Patterson |
| 2007/0033637 | A1 | 2/2007 | Yami et al. |
| 2008/0072294 | A1* | 3/2008 | Chatterjee ............... H04L 63/08 726/4 |
| 2008/0189293 | A1 | 8/2008 | Strandel et al. |
| 2010/0131409 | A1 | 5/2010 | Lawyer et al. |
| 2010/0241711 | A1 | 9/2010 | Ansari et al. |
| 2010/0250704 | A1 | 9/2010 | Kittel |
| 2010/0319062 | A1 | 12/2010 | Danieli et al. |
| 2011/0219371 | A1 | 9/2011 | Eide et al. |
| 2011/0276897 | A1 | 11/2011 | Crevier et al. |
| 2011/0319148 | A1 | 12/2011 | Kinnebrew et al. |
| 2012/0317280 | A1 | 12/2012 | Love et al. |
| 2012/0331108 | A1 | 12/2012 | Ferdowsi et al. |
| 2012/0331536 | A1 | 12/2012 | Chabbewal et al. |
| 2013/0046833 | A1* | 2/2013 | Riepling ................ G06Q 10/10 709/206 |
| 2013/0067591 | A1 | 3/2013 | Chou et al. |
| 2013/0067594 | A1* | 3/2013 | Kantor .................. H04L 67/306 726/28 |
| 2013/0275765 | A1 | 10/2013 | Lay |
| 2014/0033265 | A1 | 1/2014 | Leeds et al. |
| 2014/0067865 | A1* | 3/2014 | Kirigin ................. H04L 63/168 707/783 |
| 2014/0068401 | A1 | 3/2014 | Kirigin |
| 2014/0181198 | A1 | 6/2014 | Motes et al. |
| 2014/0188744 | A1* | 7/2014 | Nazarelli ............. G06Q 10/105 705/325 |
| 2014/0215551 | A1 | 7/2014 | Allain et al. |
| 2014/0282921 | A1* | 9/2014 | Filman .................... G06F 21/57 726/5 |
| 2014/0304836 | A1 | 10/2014 | Velamoor et al. |
| 2015/0088760 | A1* | 3/2015 | Meurs .................. G06Q 20/425 705/72 |
| 2015/0149358 | A1 | 5/2015 | Robbin et al. |
| 2016/0057148 | A1 | 2/2016 | Micucci et al. |
| 2016/0065546 | A1* | 3/2016 | Krishna .................. H04L 63/10 726/30 |
| 2016/0103801 | A1 | 4/2016 | Bortz et al. |
| 2016/0110685 | A1 | 4/2016 | Banatwala et al. |
| 2016/0205111 | A1 | 7/2016 | Byrne et al. |
| 2016/0234291 | A1 | 8/2016 | Fang et al. |
| 2016/0285890 | A1* | 9/2016 | Beausoleil ............ G06F 16/958 |
| 2016/0364665 | A1* | 12/2016 | Hurst .................. H04L 12/1818 |
| 2017/0147600 | A1 | 5/2017 | Brand |
| 2017/0155632 | A1 | 6/2017 | Filman et al. |
| 2017/0195402 | A1 | 7/2017 | Litzenberger et al. |
| 2017/0315677 | A1* | 11/2017 | Rice ........................ H04L 51/24 |
| 2018/0063115 | A1* | 3/2018 | Miller .................. G06F 21/6218 |
| 2019/0222560 | A1 | 7/2019 | Ford et al. |
| 2019/0354395 | A1 | 11/2019 | Clark et al. |

OTHER PUBLICATIONS

"Manage Email Attachments", Retrieved From: https://web.archive.org/web/20170119085743/https://www.zoho.com/mail/help/saving-viewing-attachments.html, Retrieved On: Jan. 19, 2017, 7 Pages.

Julie, "Share OneDrive Files With Another Microsoft Account", Retrieved From: https://web.archive.org/web/20170125122752/http://pocketprimer.com/share-onedrive-files-with-another-microsoft-account/, Aug. 8, 2014, 6 Pages.

"International Search Report And Written Opinion Issued In PCT Application No. PCT/US18/028968", dated Jul. 5, 2018, 12 Pages.

"International Search Report And Written Opinion Issued In PCT Application No. PCT/US18/028969", dated Jun. 12, 2018, 13 Pages.

"Final Office Action Issued in U.S. Appl. No. 15/604,119", dated Jun. 21, 2019, 31 Pages.

"Configuring OTP to Open the Document", Retrieved From: http://manuals.ascertia.com/SigningHub/default.aspx?pageid=configuring_otp_to_open_the_document, Retrieved On: Jun. 11, 2019, 2 Pages.

"HybridCloud Access and Storage", Retrieved From: https://web.archive.org/web/20130177114007/http://www.egnyte.com/file-server/online-file-server-features.html, Retrieved on Jan. 17, 2013, 7 Pages.

"Open Text Tempo Box", Retrieved From: https://web.archive.org/web/20121230180313/http://www.opentext.com/2/global/products/products-document-management/products-opentext-tempo.htm, Retrieved On: Dec. 30, 2012, 2 Pages.

"Share Files/Folders with OTP (One Time Password)", Retrieved From: https://www.youtube.com/watch?v=A_8TMDfimAl, Nov. 27, 2016, 3 Pages.

"SigningHub E-Sign Document Agreements and Contracts", Retrieved From: https://www.bing.com/videos/search?q=signinghub+otp&&view=detail&mid=65E110A9128ED3DFA1CA66E110A9128ED3DFA1CA&&FORM=VRDGAR, Apr. 22, 2015, 2 Pages.

"Simple File Sharing, Access Control and Version Management", Retrieved From: https://web.archive.org/web/20130117113455/http://www.egnyte.com/file-sharing/online-file-sharing.html, Retrieved on Jan. 17, 2013, 4 Pages.

"SMS OTP For Sharing Files & File Upload Requests", Retrieved From: https://support.inspire-tech.com/hc/en-us/articles/206405005-SMS-OTP-for-Sharing-Files-File-Upload-Requests, Retrieved On: Jun. 11, 2019, 2 Pages.

"Syncplicity: Business Edition Product Guide", Retrieved From: https://web.archive.org/web/20130118055926/http://syncplicity.com/pdfs/business_edition_product_guide.pdf, Retrieved on Jan. 18, 2013, 35 Pages.

"Final Office Action Issued in U.S. Appl. No. 13/800,522" dated Mar. 16, 2015, 23 Pages.

"Final Office Action Issued in U.S. Appl. No. 13/800,522", dated Feb. 12, 2016, 28 Pages.

"Non Final Office Action Issued in U.S. Appl. No. 13/800,522", dated Jul. 8, 2015, 26 Pages.

"Non Final Office Action Issued in U.S. Appl. No. 13/800,522", dated Aug. 29, 2014, 21 Pages.

(56) References Cited

OTHER PUBLICATIONS

"Non Final Office Action Issued in U.S. Appl. No. 15/428,902", dated Mar. 10, 2017, 28 Pages.
"Non Final Office Action Issued in U.S. Appl. No. 15/428,902", dated Sep. 8, 2017, 33 Pages.
Janakiraman, Shamila, "CCS Picks SkyDox Cloud-Enabled File Sharing and Collaboration Tools", Retrieved From: http://technews.tmcnet.com/caas/topics/caas/articles/291596-ccs-picks-skydox-cloud-enabled-file-sharing-collaboration.htm, May 23, 2012, 2 Pages.
Johnson, et al., "Laissez-Faire File Sharing", In Proceedings of the Workshop on New Security Paradigms Workshop, Sep. 8, 2009, 9 Pages.
Katrulya, Jennifer, "6 Online Document Transfer and Storage Options for Accountants", Retrieved From: https://web.archive.org/web/20150110184702/http://blog.accountants.intuit.com/proadvisor-newsletter-content/6-online-document-transfer-and-storage-options-for-accountants, Aug. 15, 2012, 8 Pages.
Krishnadas, Sajesh, "Vembu Online Data Backup Expert Tips: Managed File Sharing and Collaboration in the Cloud", Retrieved from https://web.archive.org/web/20130115034709/http://www.backupreview.info/, Jan. 11, 2013, 48 Pages.
"International Preliminary Report on Patentability Issued in PCT Application No. PCT/US2014/020452", dated Oct. 21, 2015, 8 Pages.
"International Search Report and Written Opinion Issued in PCT Application No. PCT/US2014/020452",dated Jun. 6, 2014, 9 Pages.
"Second Written Opinion Issued in PCT Application No. PCT/US2014/020452", dated Jul. 27, 2015, 7 Pages.
Rochelle, Jonathan, "See Shared Docs & Spreadsheets Before Logging In", Retrieved From: http://googledrive.blogspot.in/2007/06/see-shared-docs-spreadsheets-before.html, Jun. 6, 2007, 1 Page.
"Non Final Office Action Issued in U.S. Appl. No. 15/604,119", dated Jan. 17, 2019, 30 Pages.
"Non Final Office Action Issued in U.S. Appl. No. 15/604,119", dated Dec. 31, 2019, 31 Pages.
"Applicant Initiated Interview Summary Issued in U.S. Appl. No. 15/604,119", dated Mar. 26, 2020, 3 Pages.
"Final Office Action Issued in U.S. Appl. No. 15/604,119", dated Apr. 7, 2020, 34 Pages.
"Non-Final Office Action Issued in U.S. Appl. No. 15/604,119", dated Jun. 26, 2020, 32 Pages.

* cited by examiner

EXTERNAL SHARING WITH IMPROVED SECURITY

BACKGROUND

Storage of electronic files, such as documents, photos, spreadsheets, presentations, videos, songs, and more is virtually a necessity in modern times. Centralized storage of and access to such files in a network-accessible manner allows the files to be accessed and maintained easily and effectively from a variety of network-connected devices. One form of such storage is an on-line storage platform that is accessible over the Internet and allows users and/or organizations to create accounts with the on-line storage provider in order to securely upload, access, edit, and delete such electronic files.

With the digital storage of electronic files, it is easy to share such files with others in order to collaborate on a document or a project. However, in the context of organizations, sharing of electronic files can present a security risk. If a file is shared with a user outside of the organization (external user) improperly, it may cause a leak of corporate secrets or have other undesirable effects. Accordingly, organizations are highly sensitive to external sharing of electronic files.

The discussion above is merely provided for general background information and is not intended to be used as an aid in determining the scope of the claimed subject matter.

SUMMARY

A computing system includes a processor and a data store coupled to the processor. The computing system is configured to provide access to electronic content stored in the data store. A user interface component is configured to receive an indication of an external user with which to share an item of electronic content. A link generation component is configured to generate a link to share the item of electronic content. An access control component is configured to receive a request to access the item of electronic content using the link, and responsively generate an access code that is communicated to a known endpoint associated with the link. The user interface component is configured to receive a user input containing a user-entered access input. The access control component is configured to selectively grant access to the item of electronic content based on whether the user-entered access input matched the access code communicated to the known endpoint associated with the link.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
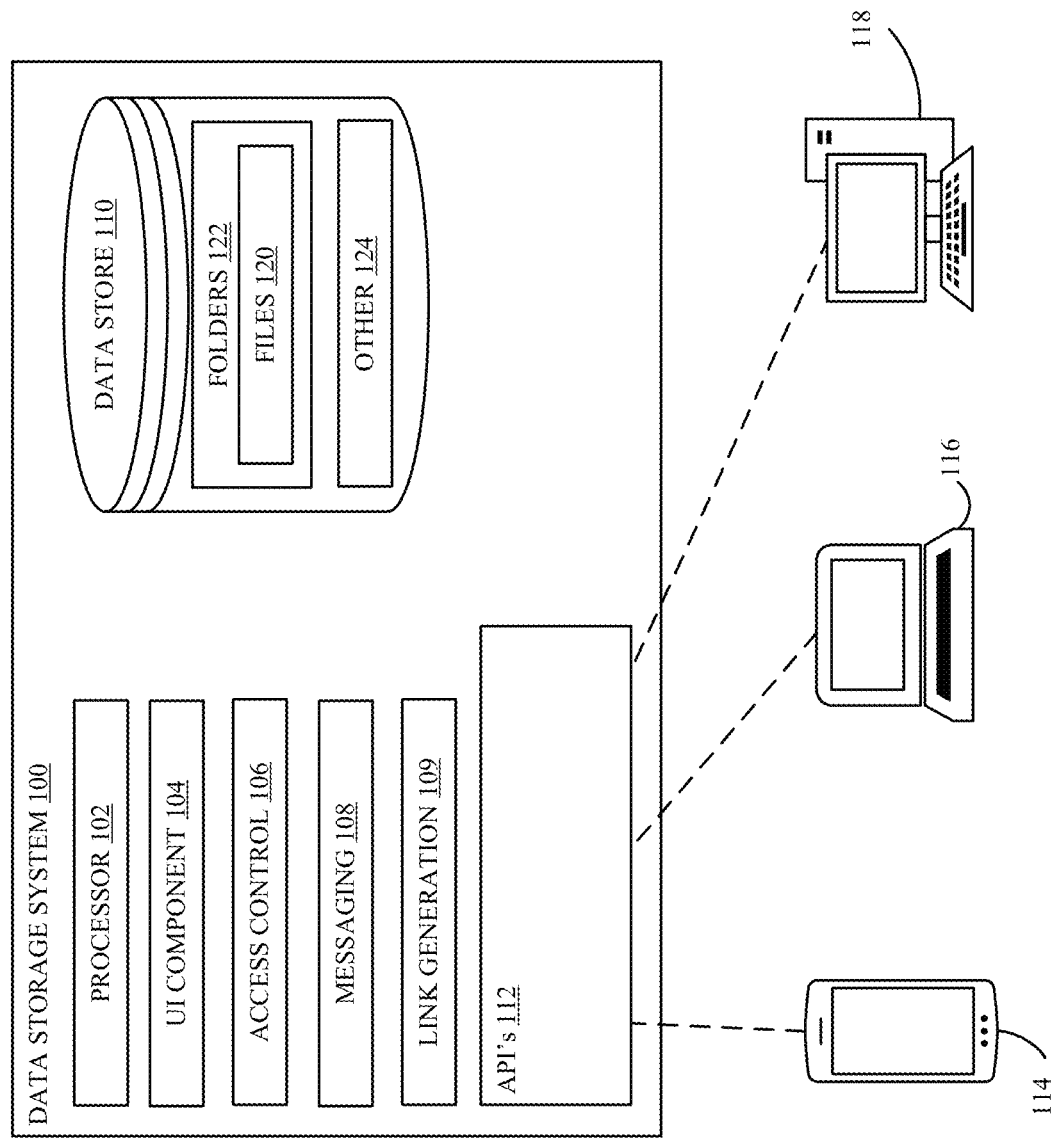
FIG. 1 is a diagrammatic view of a network-accessible data storage system with which embodiments described herein are particularly useful.

As set forth above, external sharing of electronic content is a particular security concern for many organizations. For example, when an item of electronic content is initially shared by a sharer using an on-line sharing platform, the sharer typically identifies an e-mail address of the potential sharee. Then, the on-line sharing platform generates a link that is fashioned to provide the requisite sharing privileges to the shared item(s) of content. Often, the link is automatically e-mailed to the e-mail address of the sharee. This link then provides the recipient (i.e., sharee) with the necessary access to the shared item(s) of electronic content when the recipient invokes the link. Upon such invocation, the on-line sharing platform allows the recipient to easily interact with the item(s) of shared electronic content. A potential security concern arises when the original sharer intended to provide access to the item of electronic content to the recipient by virtue of the recipient's membership to a partner organization, for example. In one instance, an employee of Contoso may want to share an item of electronic content with an employee at Fabrikam. It is currently quite difficult for the employee of Contoso to share the item of electronic content with the employee of Fabrikam in a way which is tied to the lifecycle of the Fabrikam account (i.e., ensuring that should the employee of Fabrikam be terminated, that such access to the electronic content is similarly terminated).

In accordance with one embodiment, when a recipient of an external sharing link attempts to use or otherwise invoke the link, the on-line sharing platform will generate a communication to a known endpoint of the recipient associated with the sharing link. In one example, this known endpoint is the e-mail address of the recipient (sharee). This can be done by having the on-line sharing platform send an e-mail containing an access code that the recipient must enter to the known email address of the recipient. If the sharee is unable to access their e-mail account (i.e., no longer in control or an owner of the subject e-mail account) then the sharee will not be able to provide the access code, and the on-line sharing platform will deny access to the item of electronic content despite the fact that the sharee still has a valid sharing link. In this way, embodiments described herein provide additional external content sharing security.

As can be appreciated, embodiments described herein may generate a significant number of access authentication e-mails to known e-mail addresses of external sharees. In some cases, such external sharees may desire to not have to continually receive such access communications and provide access codes to the on-line sharing platform in order to continue to access the item or items of electronic content. In some instances, the sharee will also have an account with the same on-line sharing platform as the original sharer. For example, referring back to the original example, Contoso and Fabrikam may be different tenants of the same on-line sharing service provider. In such instance, the online sharing platform may allow the sharee to associate the shared item(s) of content with the sharee's account of the on-line sharing provider. In this way, subsequent access to the item(s) of shared electronic content will not require the on-line sharing platform to send additional communications with access codes, instead, the sharee will be able to access the item(s) of shared electronic content by logging into their account.

While embodiments described herein generally have wide applicability to any electronic system that is able to store electronic files and allow multiple users to selectively access and share such electronic files, the remainder of this description will be described with respect to an on-line data storage system that is accessible over the Internet. This embodiment is considered a cloud computing embodiment.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 1 is a diagrammatic view of an on-line data storage system with which embodiments described herein are particularly useful. Data storage system 100 includes processor 102, user interface (UI) component 104, access control component 106, messaging component 108, and data store 110. Additionally, while not specifically shown in FIG. 1, data storage system 100 includes suitable circuitry or other arrangements to enable data storage provider 100 to connect to a network in order to provide access to devices 114, 116, and 118. Each of devices 114, 116, and 118 couples to or interacts with data storage system 100 via a suitable application programming interface 112.

Processor 102 is illustratively a computer processor that has associated memory and timing circuitry, not separately shown. Processor 102 is illustratively a functional part of data storage system 100 and facilitates the functionality of data storage system 100 in providing access to data in data store 110.

UI component 104 is illustratively controlled by other components, servers, or items in data storage provider 100 in order to generate user interface displays for users using devices 114, 116, and 118. Devices 114, 116, and 118 are merely provided as examples of various user devices that may be used to interact with system 100. In the illustrated example, device 114 is a mobile device, such as a smartphone; device 116 is a laptop or notebook computer; and device 118 is a desktop computer. It will be noted, however, there can also be a user interface component on devices 114, 116, and 118 which generates those user interface displays as well. Further, it will be noted that user interface component 104 can generate the user interface displays itself, or under the control of other items shown in FIG. 1.

The user interface displays illustratively include user input mechanisms that allow the users to control and manipulate data storage provider 100, in order to upload, access, share, and manage electronic files stored within data store 110. The user input mechanisms can include a wide variety of different types of user input mechanisms, such as links, icons, buttons, drop down menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Additionally, where data storage provider 100 or one of devices 114, 116, and 118 has speech recognition components, the user input mechanisms can also be actuated by using voice commands.

Access control component 106 may employ an access control list or other suitable structure that includes information that indicates permissions or access rights for each user or group of users that are able to use data storage provider 100. Additionally, access control component 106 may maintain a list of authorized users for each organization or tenant for which data storage provider 100 provides data storage services. In one embodiment, access control component 106 can provide digital directory services in order to authenticate and authorize users and/or various devices 114, 116, and 118. Accordingly, a list of users within the organization (i.e. internal users) will be maintained by access control component 106, thereby allowing access control component 106 to identify other users (outside of the organization) as any user who is not listed as a member of the particular organization. Such users are considered to be external users. Sharing electronic files with external users can be a security risk for an organization, and should be carefully controlled. Access control component 106 may also include a listing of one or more domains or tenants, and organizational content scope information indicating whether external sharing is allowed for that particular domain or tenant.

Messaging component 108 may include a messaging server or other suitable device or logic that is able to compose and/or send messages to users. Accordingly, messaging component 108 may include an e-mail server that supports the known Simple Mail Transfer Protocol (SMTP). However, messaging component 108 may also include an instant messaging server (SMS) or any other device or logic that is able to provide messages to users. Further still, in embodiments where access to data storage provider 100 is provided to one or more of devices 114, 116, and 118 via an application executing upon said devices. Messaging component 108 may include code and/or suitable circuitry to surface such messages or notifications within the application executing upon such user devices. While messaging component 108 is shown as a component of data storage provider 100, it is expressly contemplated that messaging component 108 may be remote from data storage provider 100 and controlled or otherwise engaged by data storage system 100 to generate suitable messages, such as external sharing invitations.

Link generation component 109 is configured to generate a sharing links to the electronic resources stored or otherwise managed by data storage system 100. When a user selects one or more electronic resources of the data storage system and defines how the electronic resource(s) should be shared, both internally and/or externally, link generation 109 generates a link that may be distributed or communicated to various users to allow such users to access the one or more electronic resources.

Data store 110 is shown as a single data store that is local to data storage provider 100. However, it will be noted that data store 110, in actuality, may be comprised of a number of different data stores, all of which may be local to data storage provider 100, some of which may be local to data storage provider 100, or all of which may be remote therefrom. Data store 110 illustratively stores a number of electronic files 120 within folders 122. However, other forms of data 124 may also be stored by data store 110 and made available by data storage provider 100 for access by users.

Figure 2A:
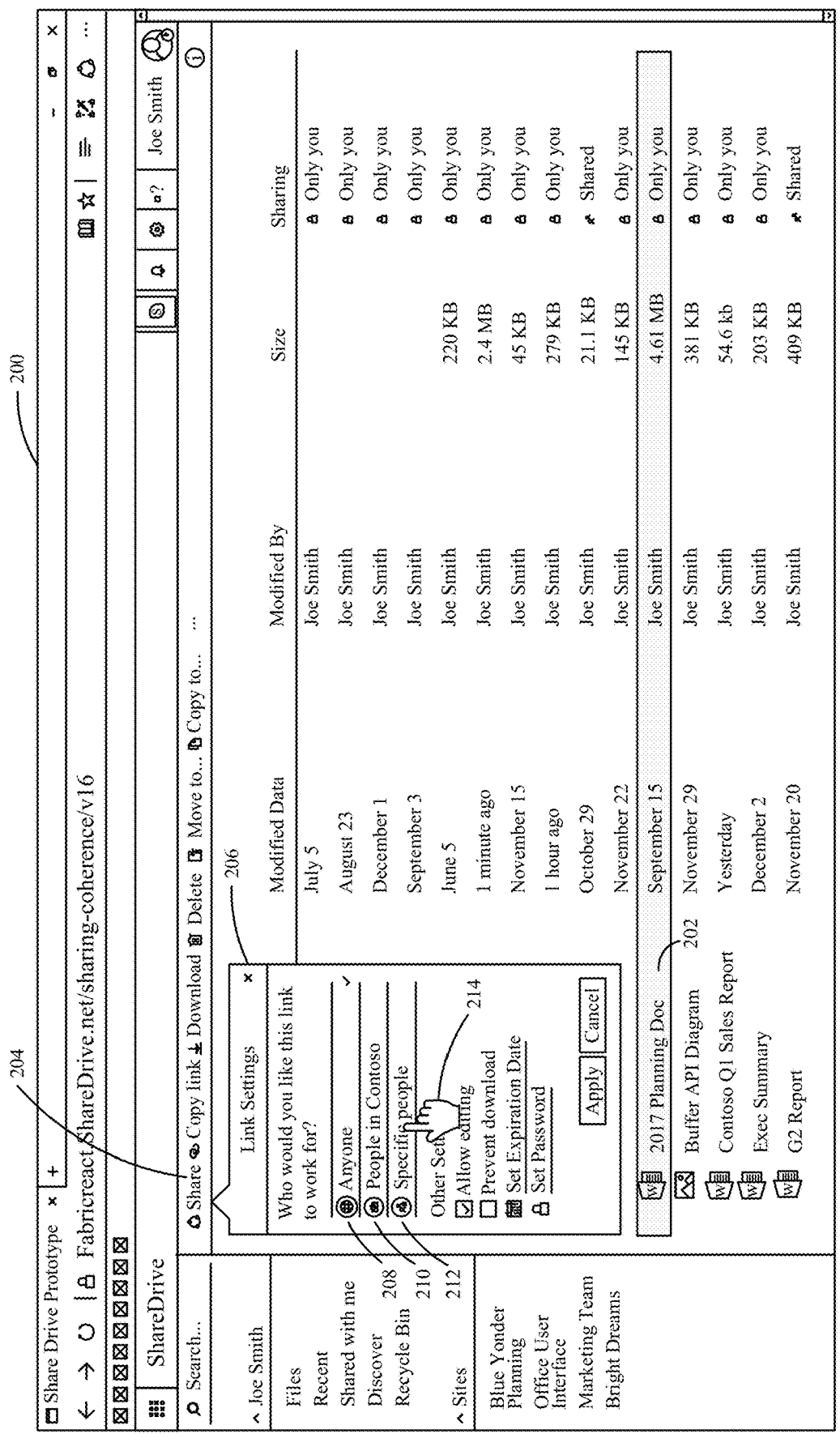
FIGS. 2A-2E are diagrammatic views of different states of a user interface as a user specifies secure external sharing in accordance with one embodiment.
Figure 2B:
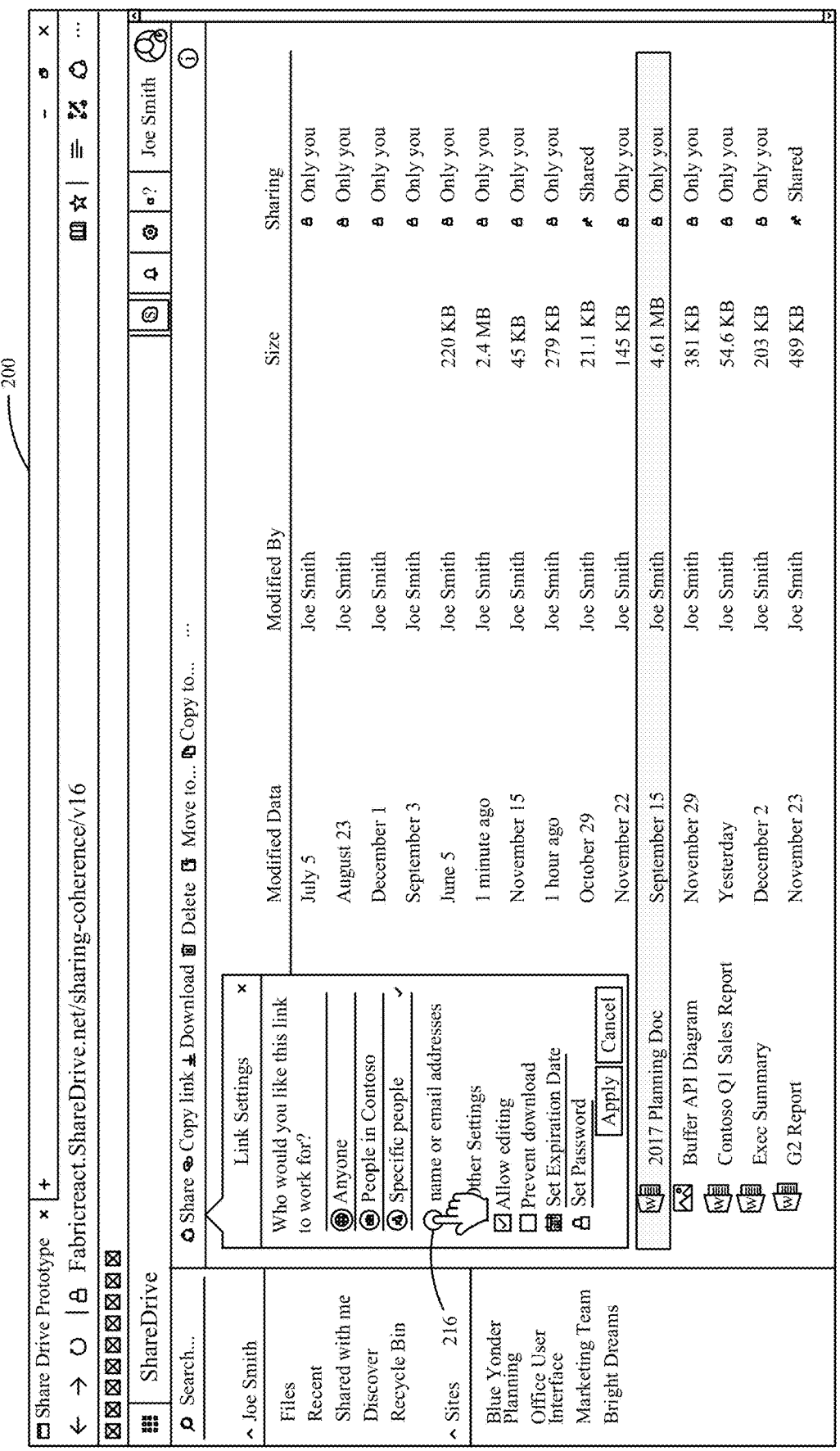
Figure 2C:
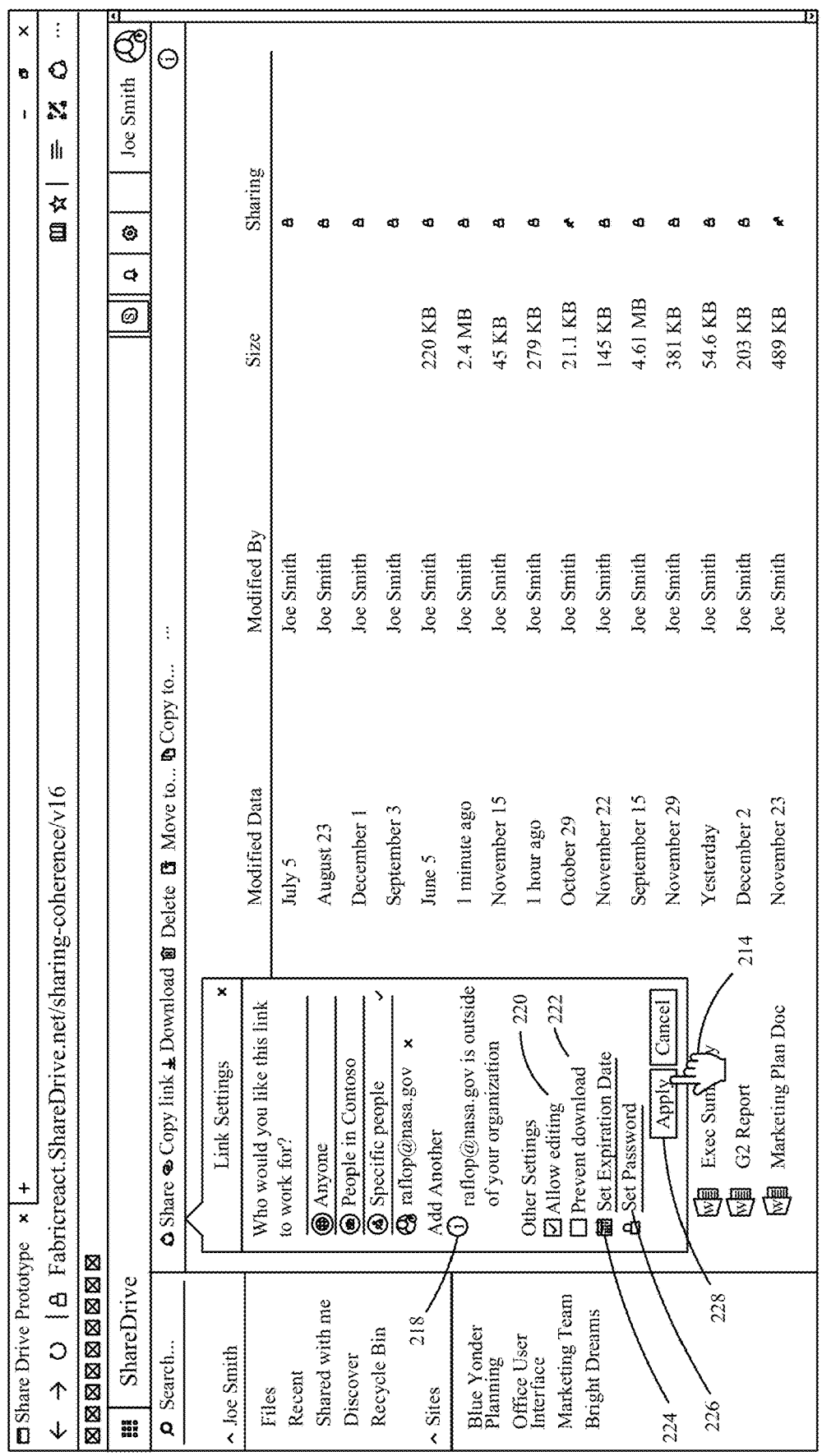

FIG. 2A is a diagrammatic view of a user interface allowing a user to specify secure external sharing in accordance with one embodiment. User interface 200 may be rendered on any suitable device, such as devices 114, 116, 118 using UI component 104 of data storage system 100. As shown, user Joe Smith has authenticated and is viewing a listing of his files. In particular, Joe Smith has identified file "2017 Planning Doc" for potential sharing. This is done by highlighting or otherwise selecting the file indicated in the shaded region at reference numeral 202 and then engaging user interface element 204 to begin the sharing process. Once user interface element 204 has been engaged, a panel 206 appears allowing the user to specify the sharing parameters. As can be seen, the user may have the ability to specify that the link will work for anyone, as indicated at user interface element 208; will work only for people within the user's organization (e.g., Contoso) as indicated at user interface element 210; or the user may specify specific people as indicated by user interface element 212. Additionally, as shown in FIG. 2A, Joe Smith is selecting element 212 as indicated by the hand-shaped cursor 214 positioned above user interface element 212. When Joe Smith engages user interface element 212, user interface 200 transitions from the state shown in FIG. 2A to that shown in FIG. 2B. In particular, a field 216 is provided that allows Joe Smith to enter one or more specific e-mail addresses of recipients of the sharing link that is being created. FIG. 2C shows that user Joe Smith has entered the e-mail address of a user at nasa.gov. The user's e-mail address is raflop@nasa.gov. Additionally, since the nasa.gov e-mail address is not identified as within the Contoso account, access control component 106 has indicated to user Joe Smith that the specified e-mail address is outside of the user's organization, as indicated by warning 218. Additionally, as shown in FIG. 2C, user Joe Smith can select additional parameters beyond the specification of individual link recipients. Specifically, the user can select whether the recipient of the sharing link may be allowed to edit the item of electronic content, as indicated at field 220. Additionally, Joe Smith can determine whether the recipient of the sharing link is allowed to download the item of electronic content from data storage system 100, or whether the user may only access the item of electronic content within data storage system 100, as indicated at "Prevent Download" user interface element 222. Further, user Joe Smith can set an expiration date using user interface element 224 that specifies a date in the future when the link will no longer function. Finally, the user can also specify, via set password field 226, a specific password that must be entered by the recipient of the sharing link in order to access the item or items of electronic content.

Figure 2D:
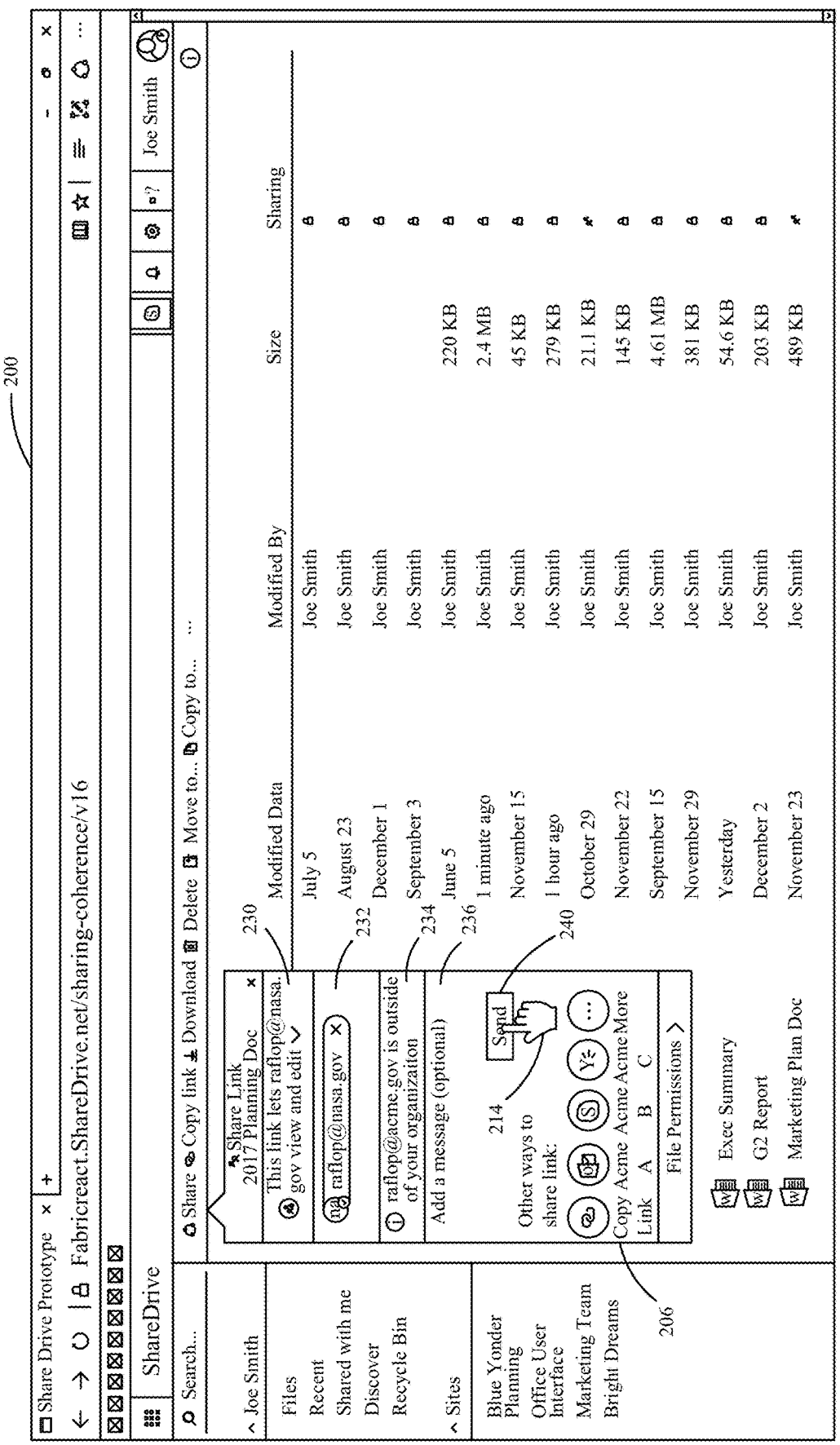
Figure 2E:
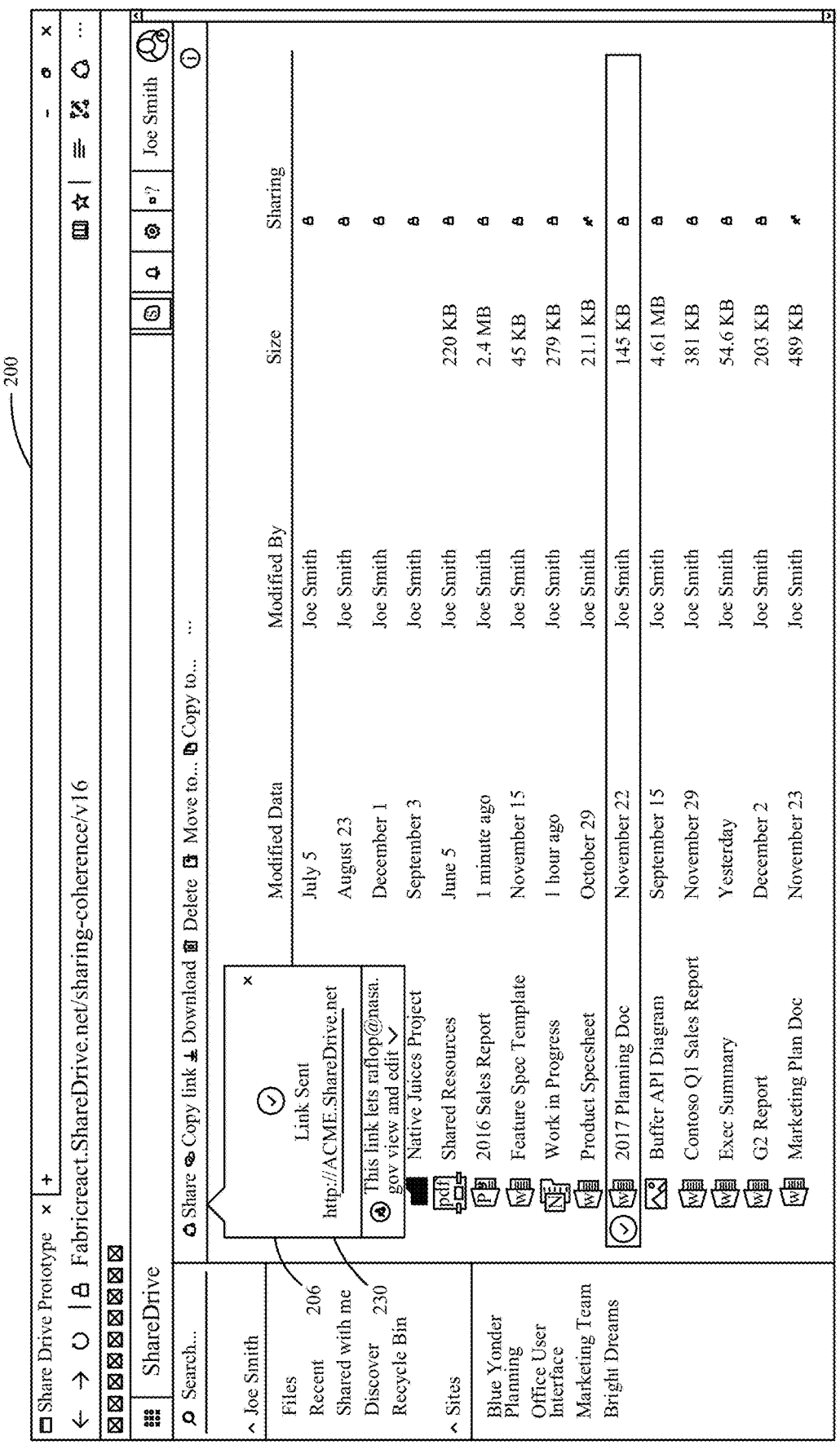

Once the user has suitably fashioned or set all of the parameters for the link, the user may cause link generation component 109 to generate a suitable link by clicking on the apply user interface element 228. This is shown by cursor 214 positioned over element 228. When the user so engages apply element 228, the user interface transitions from the state shown in FIG. 2C to that shown in FIG. 2D. As can be seen in FIG. 2D, pane 206 now shows a summary of the sharing link. In particular, the file name "2017 Planning Doc" is shown under the "Share Link" header of pane 206. Additionally, the permissions provided to the one or more users by virtue of the share link are shown in permissions field 230. In particular, field 230 indicates that the link lets raflop@nasa.gov view and edit the item of electronic content. Additionally, indicated recipients are shown in recipient field 232. In this example, a single recipient, "raflop@nasa.gov" is shown. Additionally, a warning field 234 advises the user that the selected recipient is an external recipient. This is shown by indicating that the identified recipient is outside of the user's organization. Further, a field 236 is provided to allow the user to add an optional message that will be provided to the recipient of the sharing link. In this way, the sharer may provide simple instructions or additional comments that may provide context to the recipient regarding the item(s) of electronic content. In the example shown in FIG. 2D, all of the summary information indicated in pane 206 is acceptable to the user and the user has engaged "send" user interface element 240 as indicated by cursor 214 being positioned over element 240. When this occurs, the user interface state shown in FIG. 2D transitions from that of FIG. 2D to the state shown in FIG. 2E. In this case, pane 206 now indicates that the sharing link has been sent. Additionally, in the example shown in FIG. 2E, a permissions field 230 is still shown indicating the permissions that the recipients of the link will have.

Figure 2F:
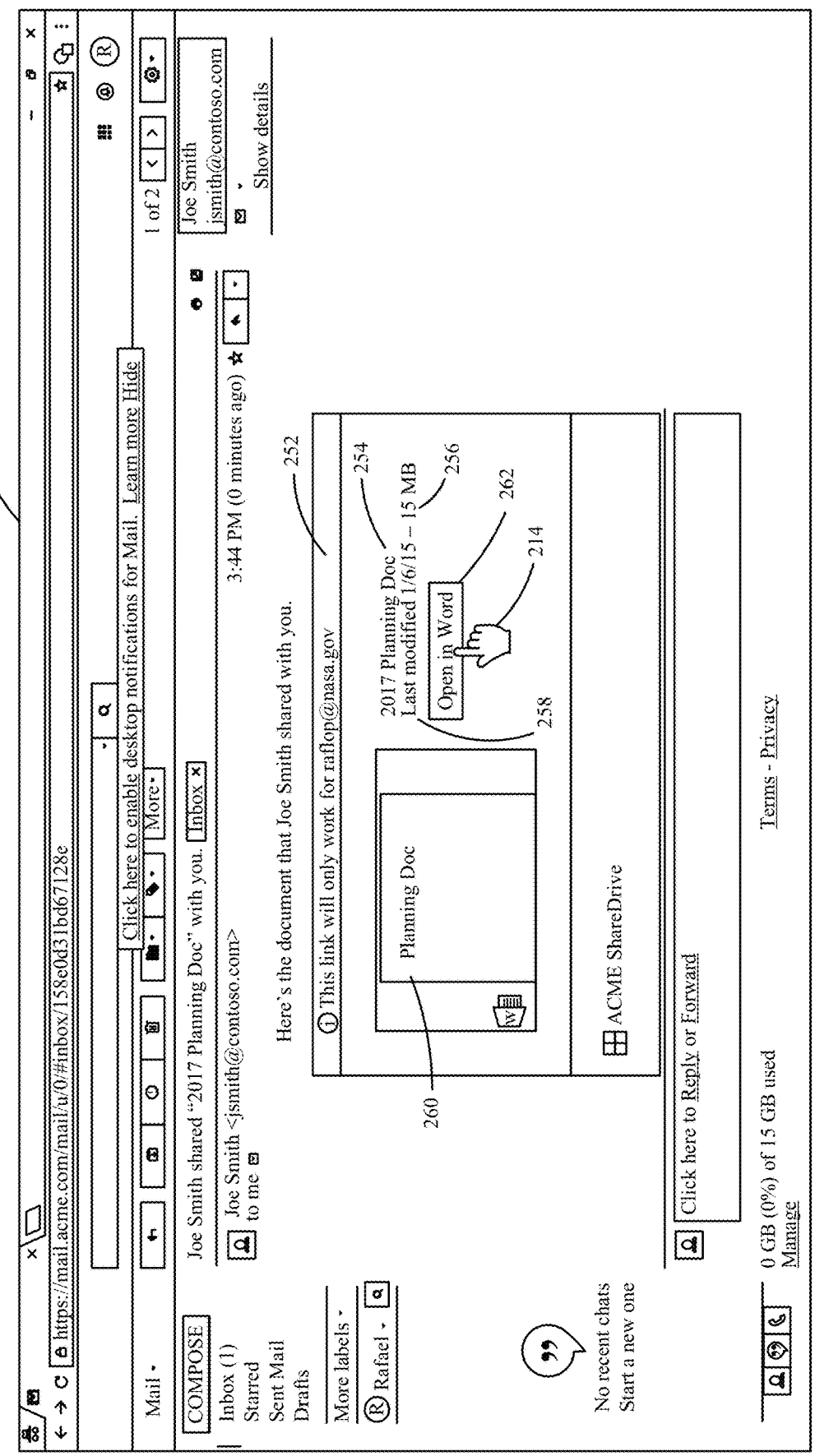
FIG. 2F is a diagrammatic view of a user interface of a messaging application illustrating receipt of an external sharing link in accordance with one embodiment.
Figure 2G:
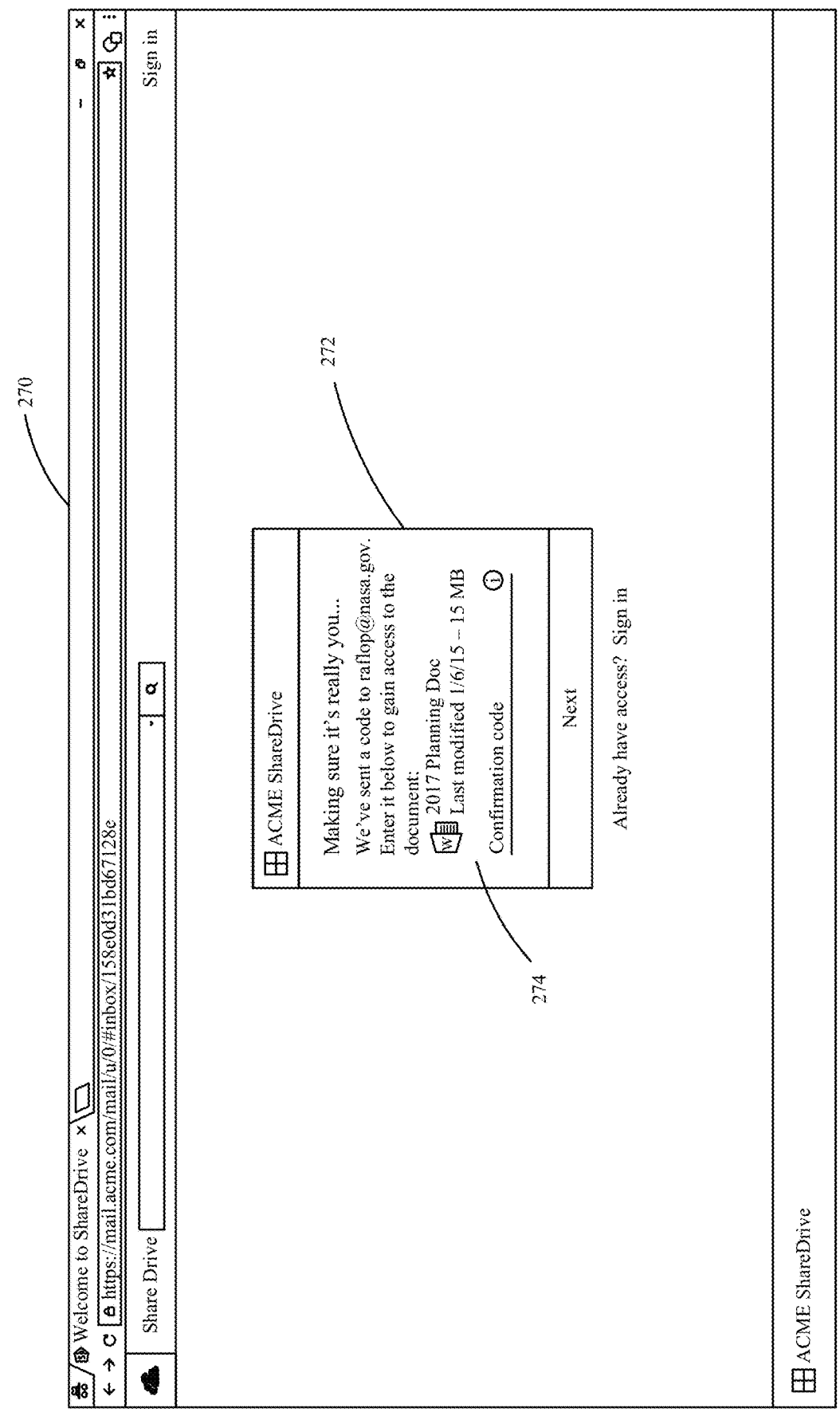
FIG. 2G is a diagrammatic view of a user interface indicating transmission of an access code message in accordance with one embodiment.
Figure 2H:
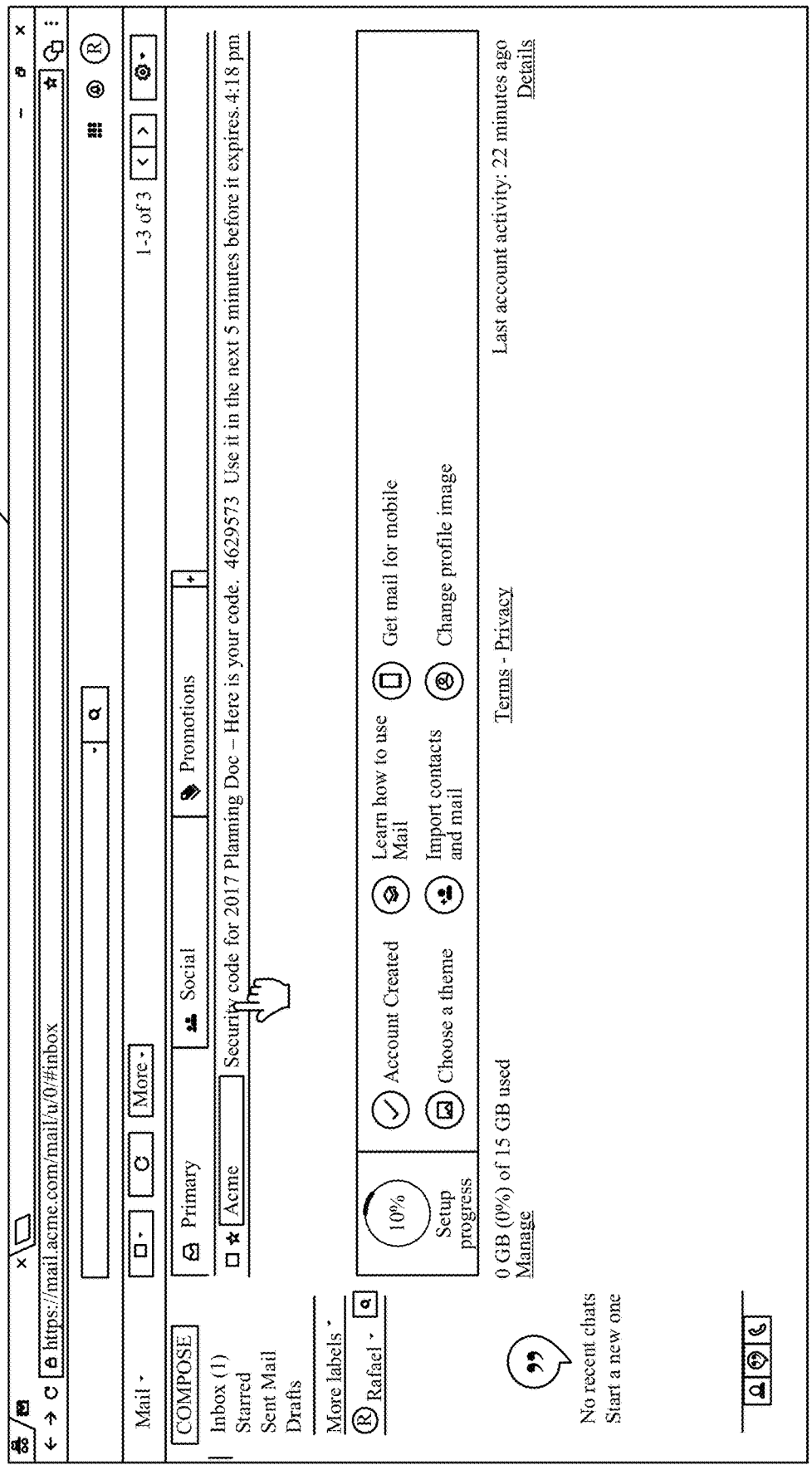
FIGS. 2H and 2I are diagrammatic views of different states of a user interface of a messaging application illustrating receipt of an access code message in accordance with one embodiment.
Figure 2I:
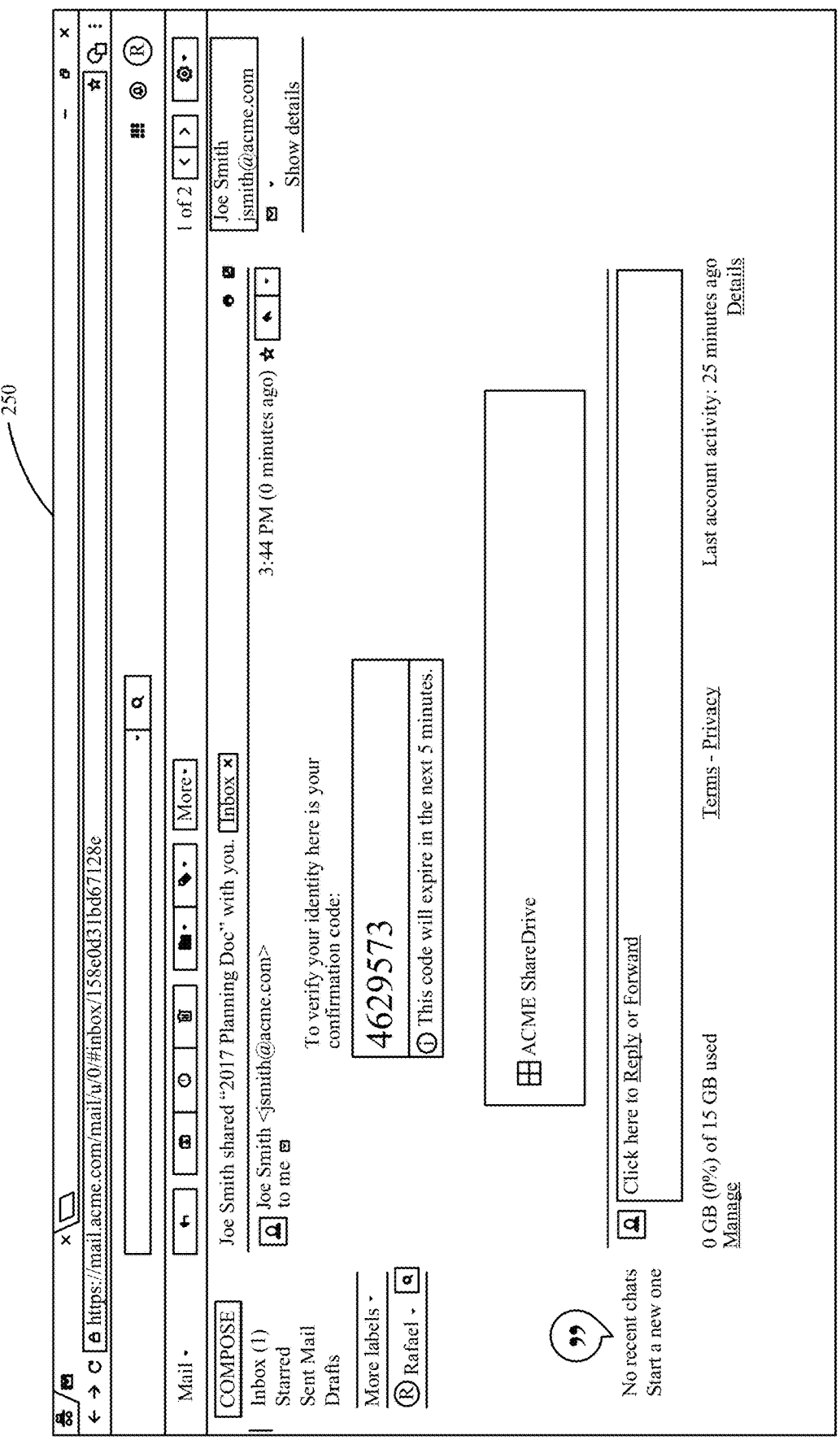

FIG. 2F is a diagrammatic user interface of a messaging system showing an electronic message received by a recipient of the sharing link sent by user Joe Smith in FIG. 2D. In the example shown in FIG. 2F, the user interface 250 is an on-line electronic messaging user interface, such as that provided by any of the known messaging providers. Interface 250 shows that the user has selected the received e-mail and it contains a message indicating, "Here is the document that Joe Smith shared with you." Additionally, the electronic message provides an indication 252 that the link will only work for raflop@nasa.gov. The electronic message also provides the file name in field 254 as well as an indication of size 256 and the date that the item of electronic content was last modified, as indicated at reference numeral 258. A summary view 260 of the item of electronic content can also be provided as indicated at reference numeral 260. The user, in this case raflop@nasa.gov, can open the shared link by engaging user interface element 262 that is provided directly within the electronic message. Actuation of the link is indicated by the user's cursor 214 being positioned over user interface element 262. When element 262 is engaged, the user's browser or device will transition to a user interface being provided directly from UI component 104 of data storage system 100. This is indicated at reference numeral 270 in FIG. 2G. Data storage system 100 wishes to make sure that the user is really the user as indicated at pane 272. Further, pane 272 indicates that a code has been transmitted to the e-mail address of the user. In this case, an additional electronic e-mail has been transmitted to the user at e-mail address raflop@nasa.gov. It is useful to note that this is a second communication to the user, where the first communication originally provided the sharing link which was engaged as shown in FIG. 2F. Additionally, pane 272 includes a field 274 that is configured to receive a confirmation code that must be entered by the user. This confirmation code is provided in the electronic e-mail that is sent to the link recipient. FIG. 2H shows the user's electronic messaging user interface providing an additional e-mail message. In this case, the e-mail has a subject line Security code for 2017 Planning Doc. The subject further indicates, "Here is your code: 4629573. Use it in the next 5 minutes before it expires." A feature of at least one embodiment is that the code has a relatively short lifespan within which the code must be entered back into field 274 in FIG. 2G. This ensures that the potential access to the shared item (2017 Planning Doc) is only to an authorized user of the e-mail address to which the original link was provided. In this way, if user raflop is terminated or is otherwise no longer associated with the nasa.gov account, the user will not be able to use the link to access the item of electronic content. As shown in FIG. 2I, user raflop@nasa.gov has opened the e-mail indicating the confirmation code described above with respect to FIG. 2H. Moving to FIG. 2K, the user has returned to user interface 270 (original shown in FIG. 2G) and entered confirmation code 4629573 in field 274 and then selected the next user interface element 276. Upon such selection, access control component 106 determines whether the entered access code matches the access code sent by messaging system 108 to the user. If the codes match, access control 106 grants access to the shared item of electronic content, as indicated in the user interface shown in FIG. 2J.

Figure 2J:
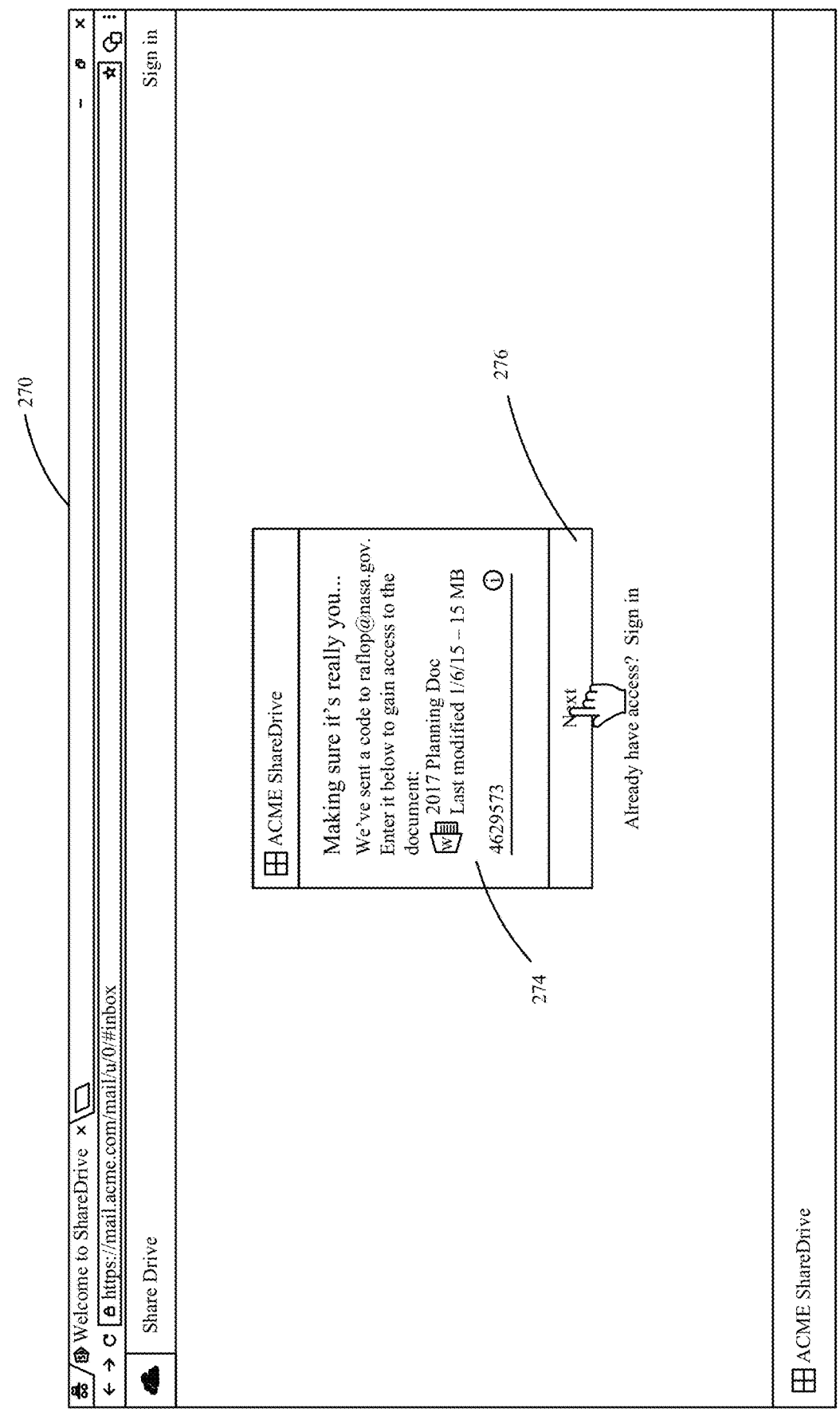
FIGS. 2J and 2K are diagrammatic views of different states of a user interface showing receipt of a proper access code and access to an item of electronic content in accordance with one embodiment.
Figure 2K:
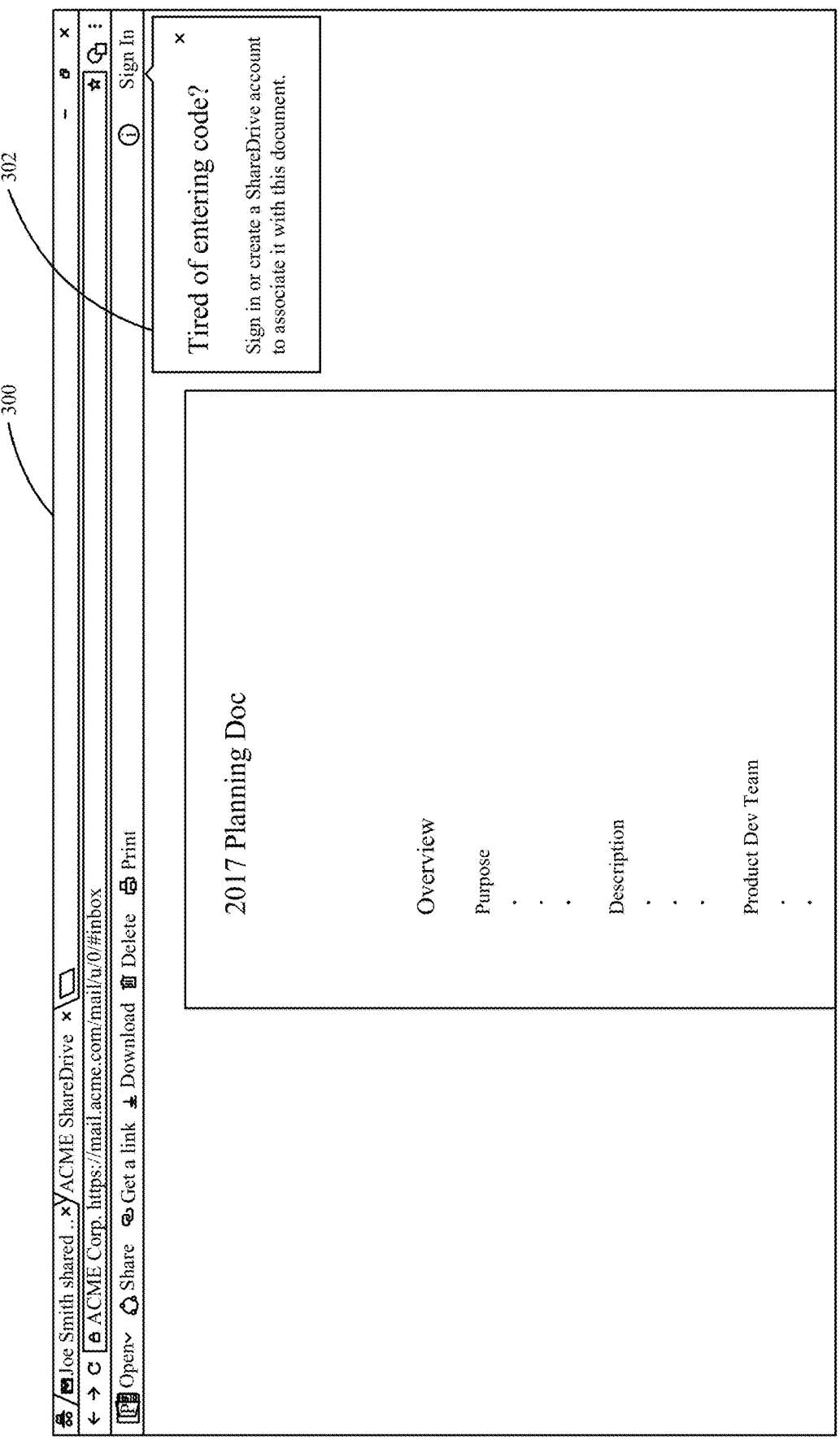
Figure 2L:
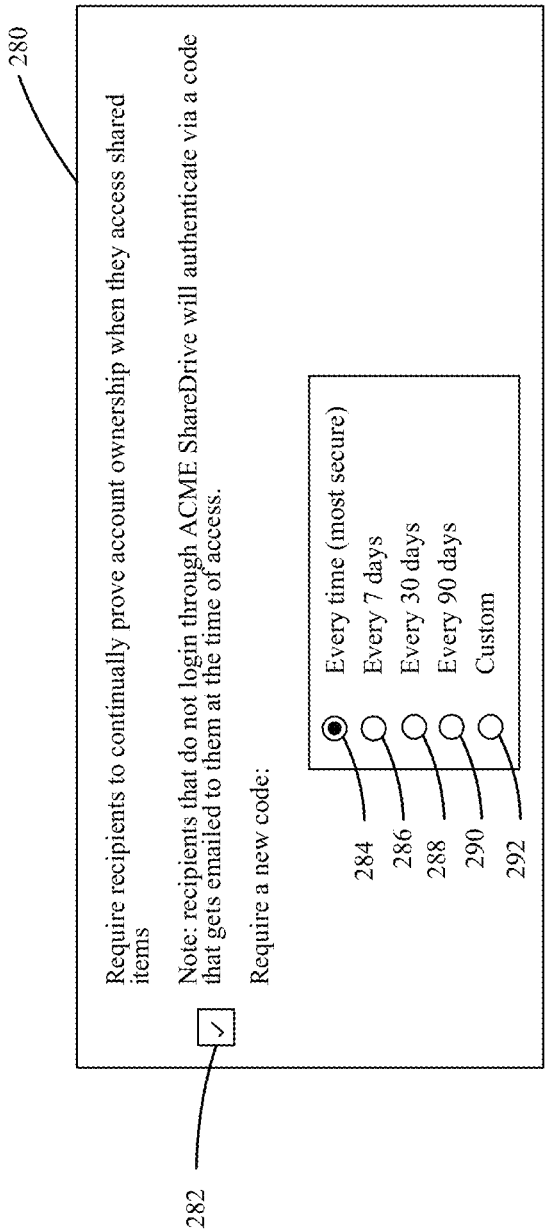
FIG. 2L is a portion of an administrative user interface allowing an administrator or responsible party to set one or more options relative to external sharing in accordance with one embodiment.

FIG. 2L is a portion of an administrative user interface allowing an administrator or responsible party to set one or more options relative to external sharing in accordance with one embodiment. Administrative user interface 280 is generated by UI component 104 when a user with administrative privileges for the domain successfully authenticates to data storage system 100 and chooses to administer the sharing settings. While a number of other settings may be changes, user interface portion 280 is directed to requiring externally sharing recipients to prove account ownership, in accordance with one embodiment. As shown at check box 282, an administrator may enable or disable the feature of proving account ownership for the entire domain simply by selecting or deselecting check box 282. In the illustrated example, the administrator has selected the feature that will require recipients to continually prove account ownership. When this occurs, the administrator may have additional details that can be set regarding how frequently the data storage system will require such users to prove account ownership. For example, checking or selecting user interface element 284 will ensure that each time an external user attempts to use an external sharing link, data storage system 100 will require the external user to prove account ownership, as set forth above. Different frequencies can also be used. For example, if the administrator selects user interface element 286, the external user will only be required to prove account ownership if it has been more than 7 days since they proved account ownership. Similarly, user interface elements 288 and 290 allow the selection of every 30 days, and every 90 days, respectively. Certainly, other frequencies can be used in accordance with various embodiments. Additionally, a "custom" user interface element 292 is provide that, when selected, lets the administrator set custom criteria to define when to require an external user to prove account ownership. Examples, can include temporal customizations, such as specifying a number of days; access customizations, such as requiring the external user to prove account ownership anytime the incoming IP address or MAC address is different than a previous address used when account ownership was proven. For example, custom setting 292 may require the external user to prove account ownership whenever they access the sharing link from a different computing device. Certainly, other forms of custom criteria can also be specified.

Figure 3:
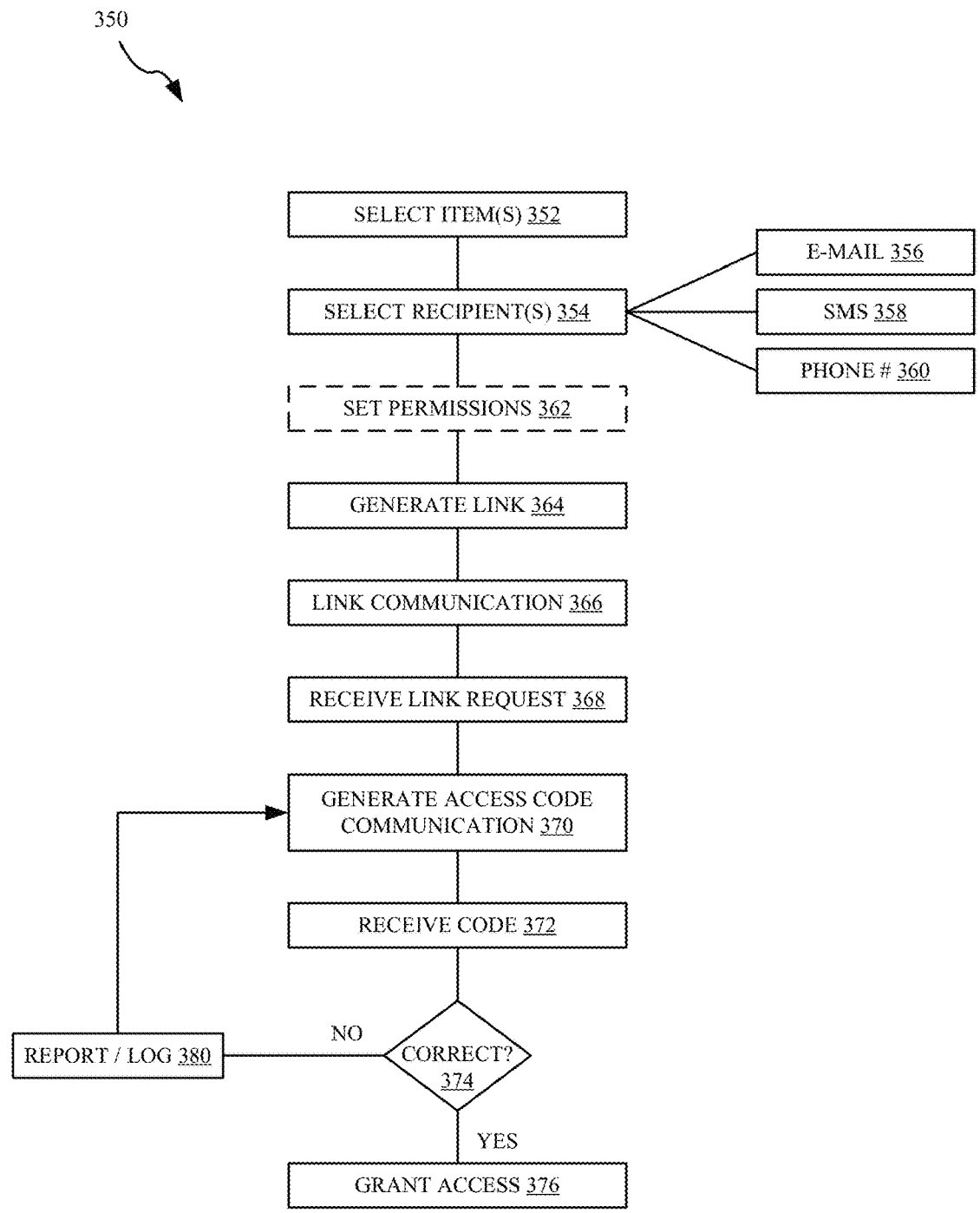
FIG. 3 is a flow diagram of a method of providing access to an item of electronic content with a data storage system in accordance with one embodiment.

FIG. 3 is a flow diagram of a method of providing access to an item of electronic content with a data storage system in accordance with one embodiment. Method 350 begins at block 352 where a user of a data storage system identifies one or more items to be shared with an external user. Next, at block 354, the user selects one or more specific recipients with which the selected items of content will be shared. An example of the identification of specific recipients includes the user providing one or more e-mail addresses such as shown in field 218 in FIG. 2C. The e-mail address(es) may be associated with an external organization or entity, such as a partner organization. The sharer of the selected item(s) of content generally indicates a known communication endpoint for the recipient that is controlled by the partner organization. For example, if the user is an employee of Contoso, and the external recipient of the sharing operation is an employee of Fabrikam, then the user will select an e-mail address or other communication endpoint within the domain of Fabrikam that is controlled or otherwise owned by the user. Thus, while the embodiment is described with respect to e-mail 356, other communication endpoints, such as SMS 358 and phone number 360 are also contemplated. Next, at optional block 362, the sharer of the selected item(s) of electronic content may set one or more permissions relative to allowed activities that the recipient of the sharing operation can perform on the selected item(s) of content. Examples of activities include reading, modifying, deleting, etc. In addition to setting permissions at block 362, other parameters relative to the sharing operation can be set including, prohibiting the recipient from downloading the file from the data storage system and/or setting an expiration date after which the sharing link will no longer function.

Once the item(s) of electronic content have been selected, and the recipient(s) have been set, and optional permissions have been set, the sharer of the electronic content may indicate that they are done configuring the sharing operation, and the data storage system will generate a link using link generator 109, as indicated at block 364. While the link may be communicated to the recipient of the sharing operation in any suitable form, the embodiment described herein generally proceeds to automatically send an electronic communication containing the link to the recipient as identified by the recipient's e-mail address, as indicated at block 366. When the recipient receives the sharing link, they may actuate the link in order to access the electronic content. When the link is actuated, the data storage system will receive a link request, typically in the form of an HTTP request, as indicated at block 368. Upon receipt of such a link request, data storage system 100, using messaging system 108, or other suitable messaging functionality, generates an access code communication to the recipient of the sharing link, as indicated at block 370. Additionally, in one embodiment, the communication indicates a specific timeframe, such as five minutes, within which the access code provided in the communication must be entered into the data storage system by the recipient. As shown at block 372, the data storage system receives a code via user interface component 104 from the recipient of the sharing link. If the code is received within the requisite time, and matches the code sent to the recipient, block 374 will pass control to block 376 where the recipient of the sharing link is granted access to the item(s) of electronic content. However, if the code is not received in time, or if the received code does not match the code sent to the recipient, then a report or log of the access problem can be generated, as indicated at block 380, and control may be returned to block 370 where an additional code and electronic communication containing such is generated to the user. If a certain number of attempts, such as three, are not successful, the process may end with an indication to the recipient that access will not be granted.

As can be appreciated, requiring an external user to receive an access code and enter the access code within a specified short period of time each and every time, or at least relatively frequently, with respect to items of shared electronic content, can become tedious to such users. Accordingly, as shown in FIG. 2J, if the external sharee of the item of electronic content also has an account with data storage system 100, a user interface element 302 is provided. As shown in FIG. 2J, user interface element 302 inquires "Tired of entering a code?" Element 302 then indicates that the user may sign in or create an account with data storage system 100 to associated the account with the shared item of electronic.

Figure 4A:
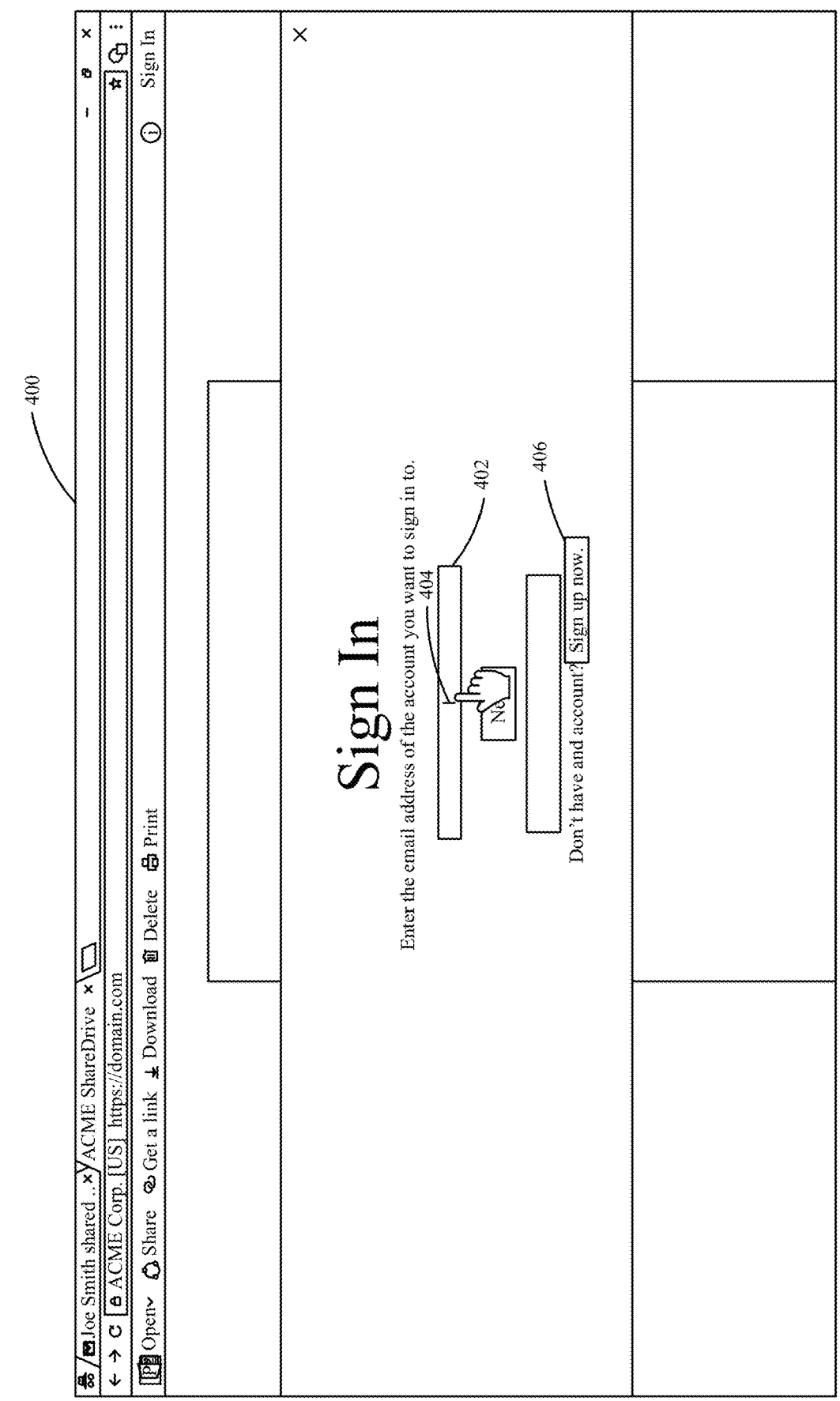
FIGS. 4A-4D are diagrammatic views of different states of a user interface as a user authenticates with a different organizational account of an online storage provider in order to associate externally shared content with the different organizational account in accordance with one embodiment.
Figure 4B:
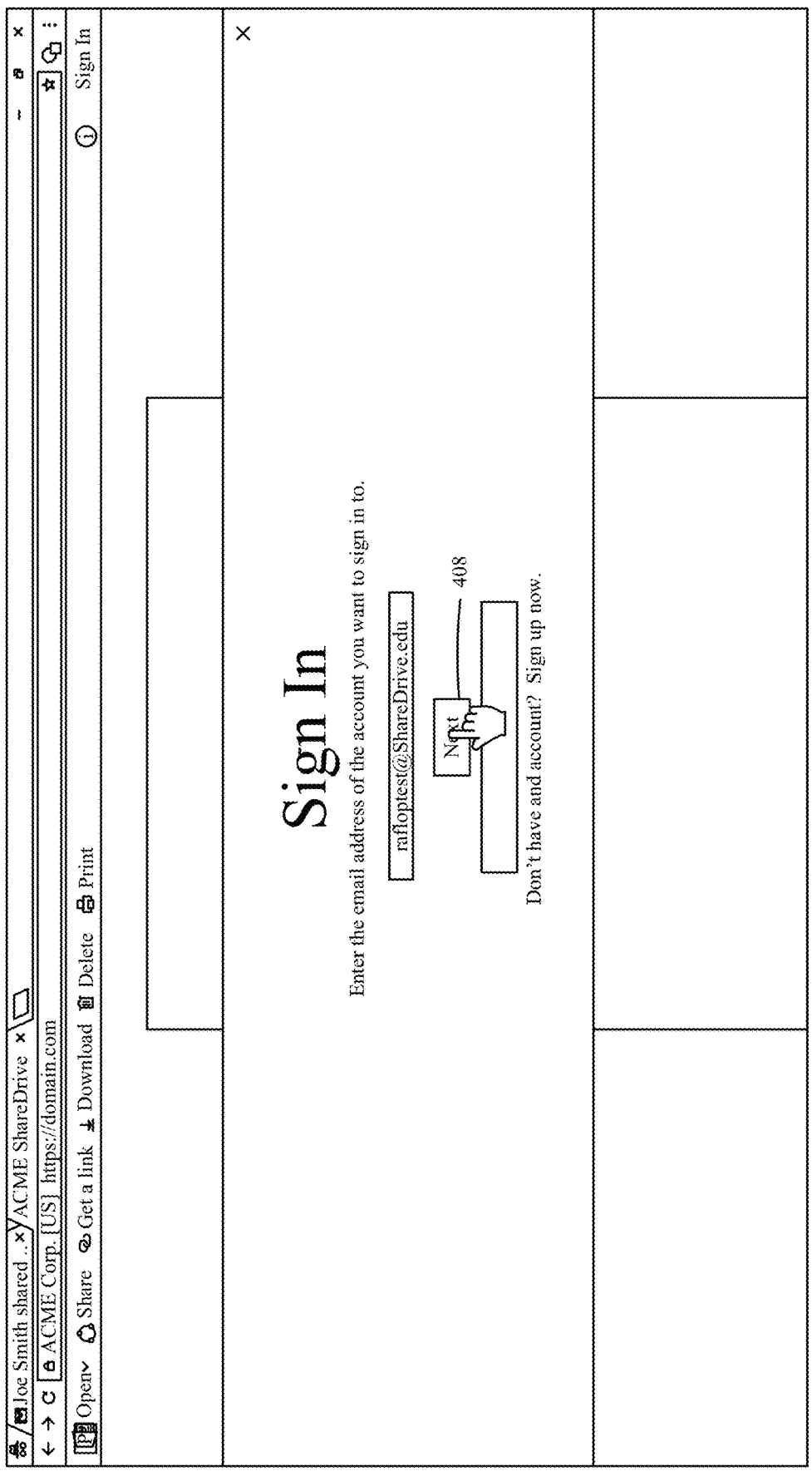
Figure 4C:
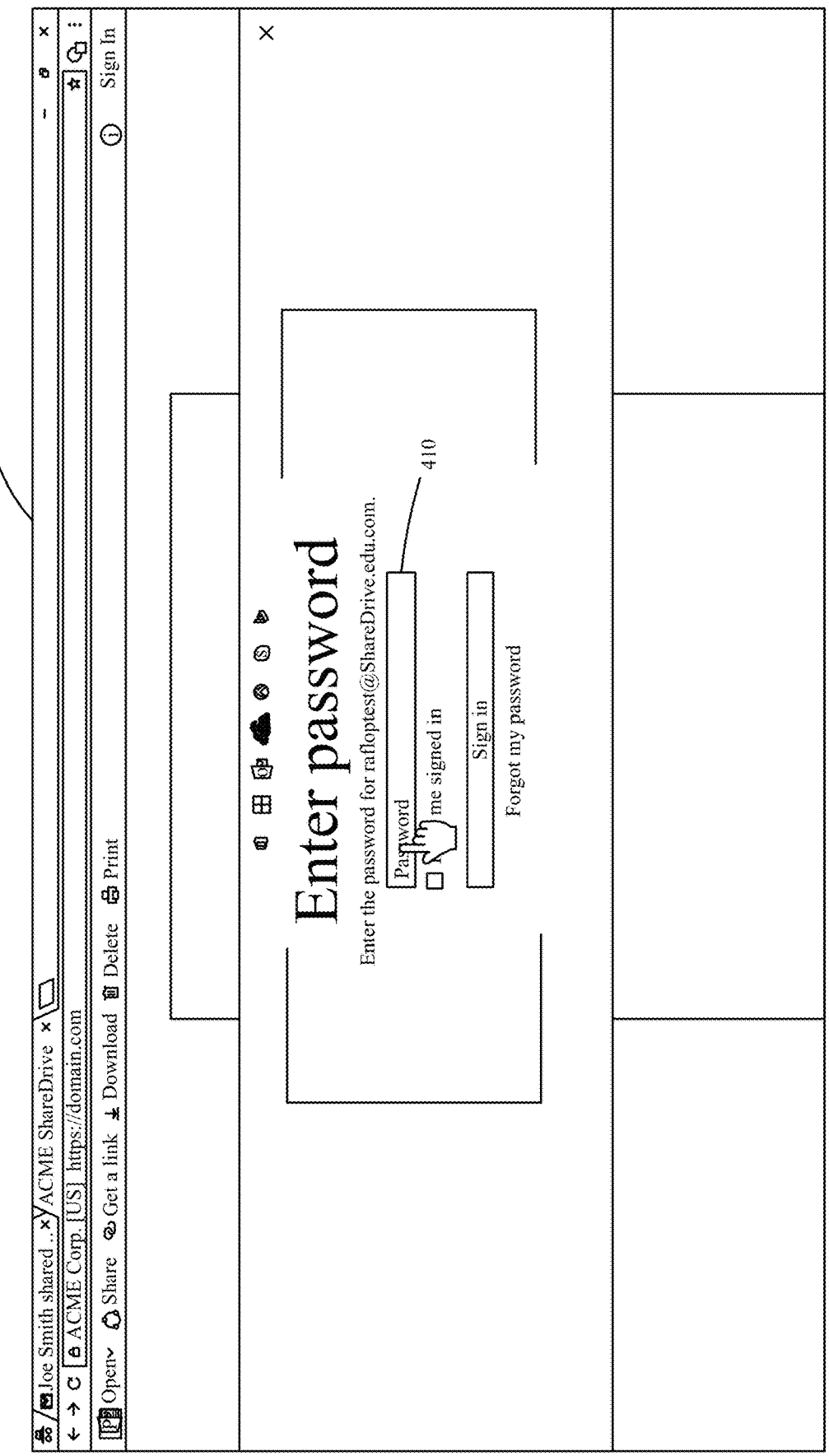
Figure 4D:
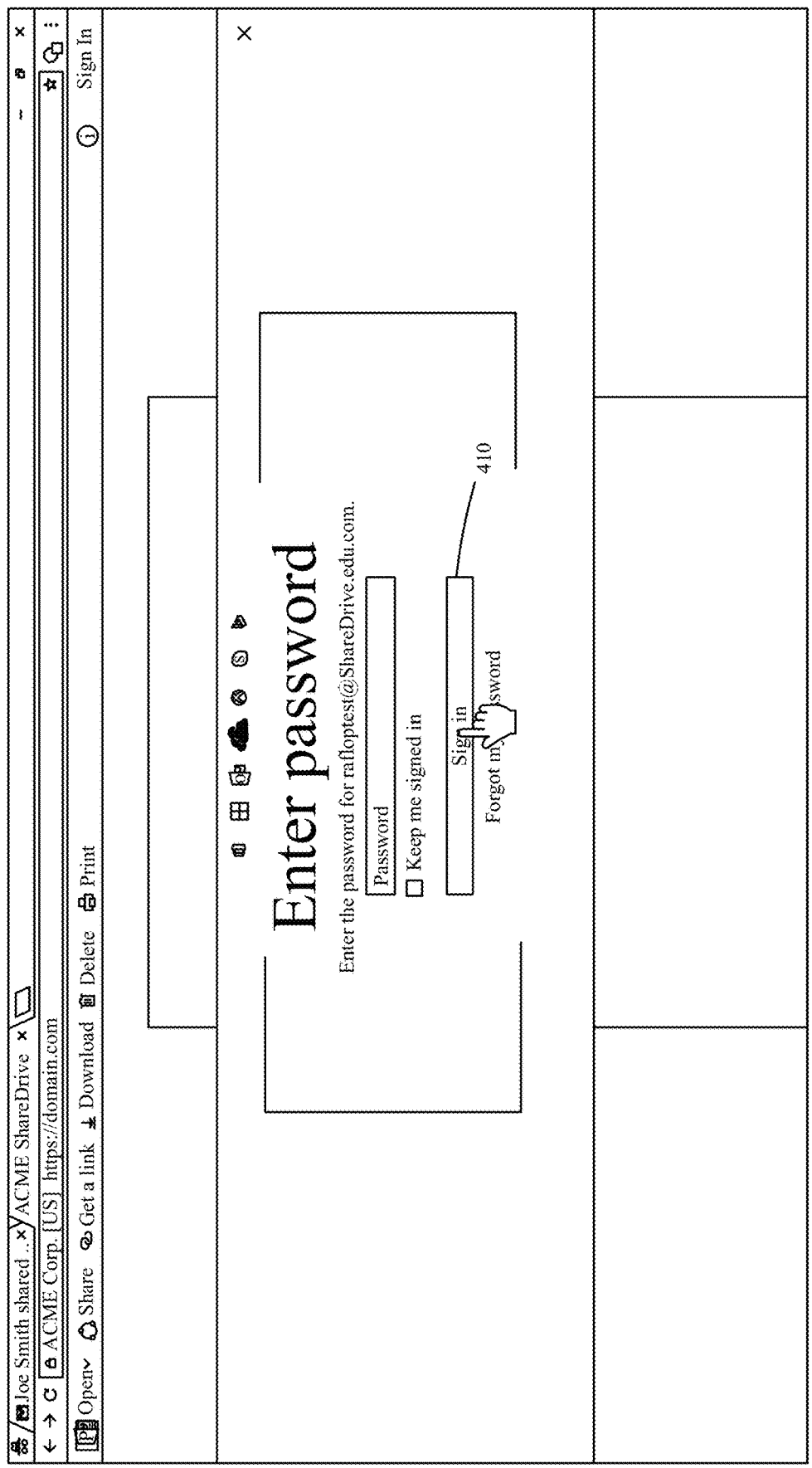
Figure 4E:
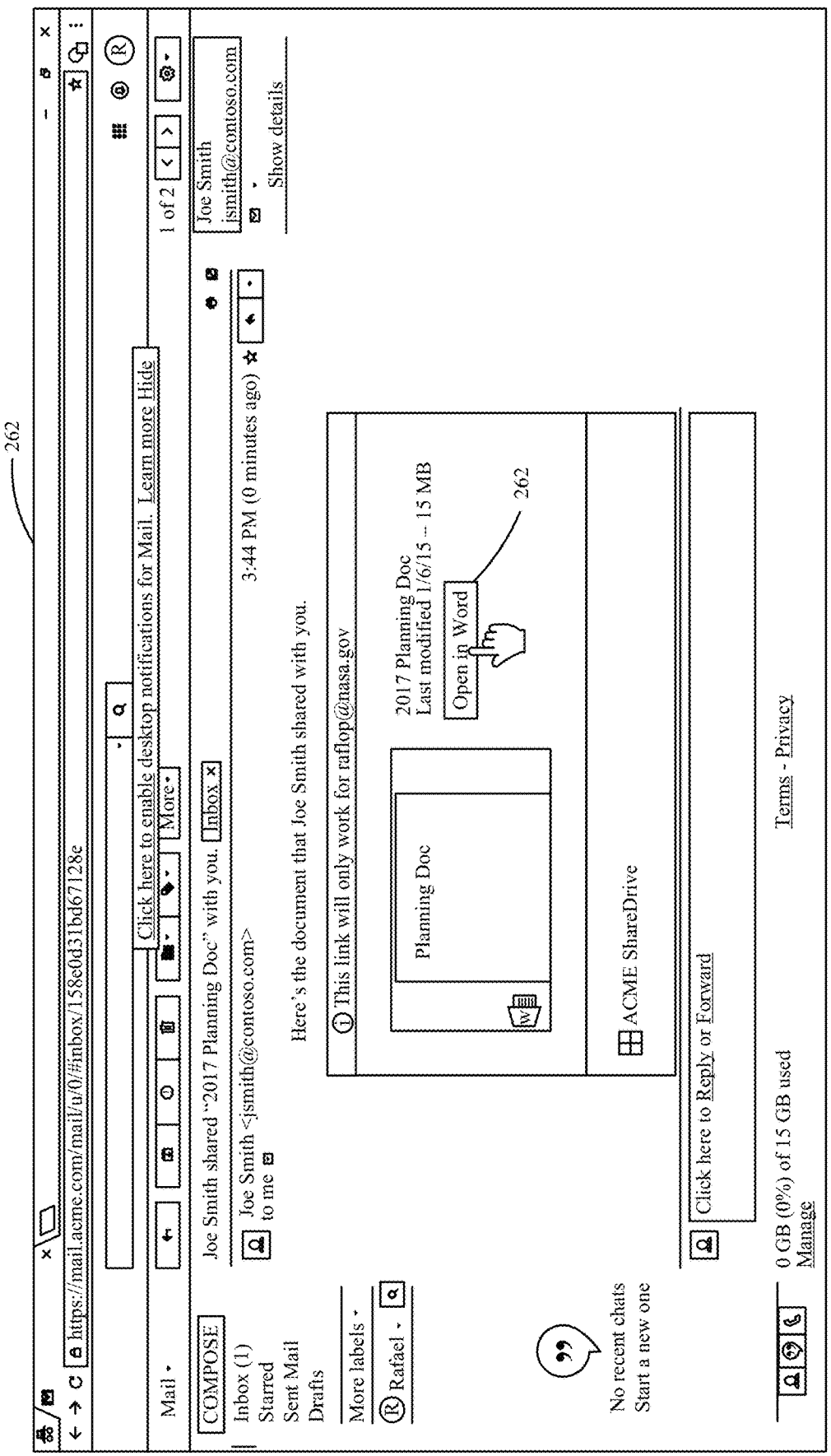
FIG. 4E is a diagrammatic view of a user interface of a messaging application illustrating receipt of an external sharing link in accordance with one embodiment.
Figure 4F:
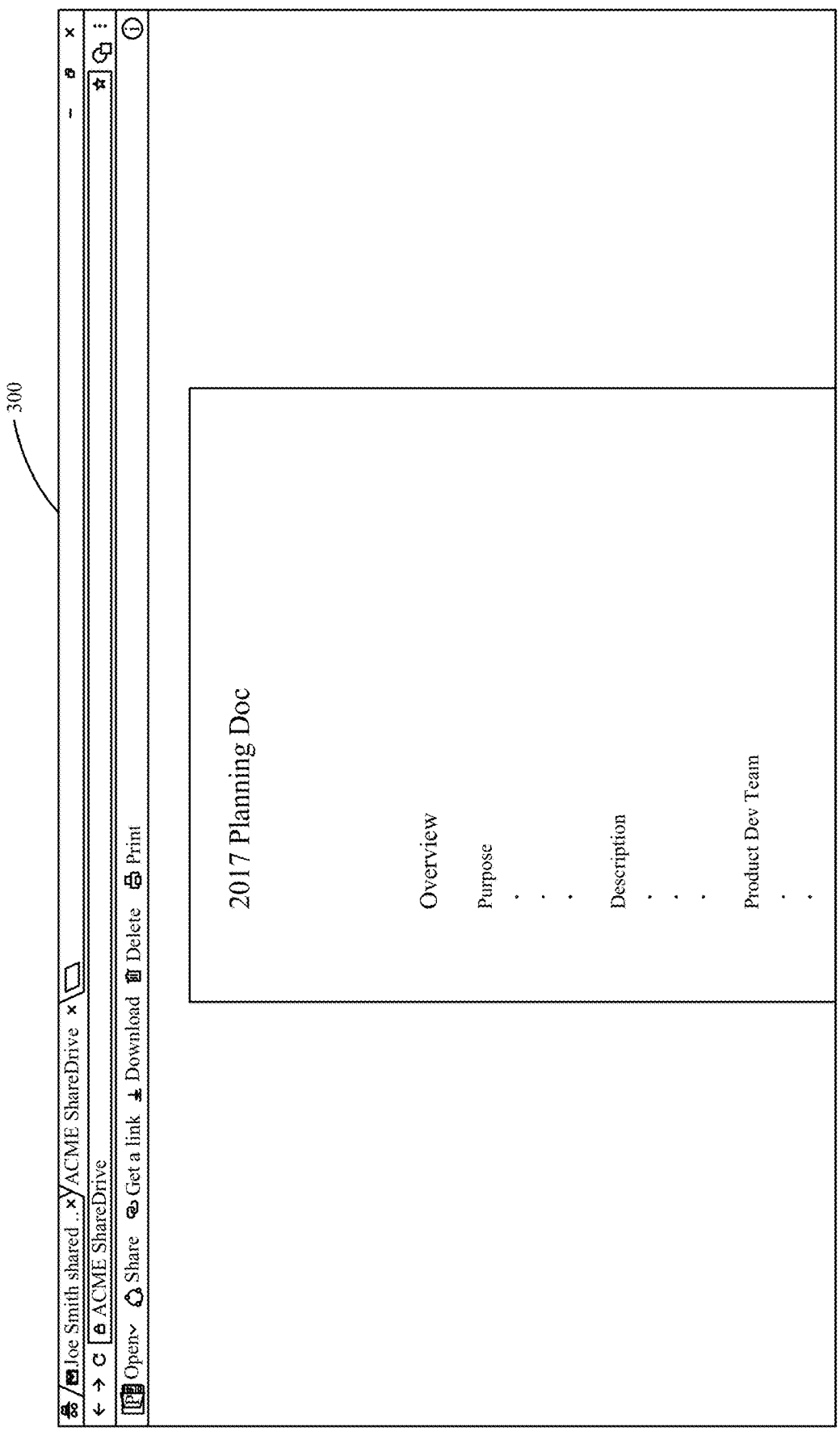
FIG. 4F is a diagrammatic view of a user interface as a user is granted access to an externally shared item of content that is associated with the user's different organizational account in accordance with one embodiment.

Returning to the discussion of FIG. 2K, once the recipient of the sharing link has properly been granted access by entering the code provided in the access code communication message, data storage system 100 knows that the user is an authorized user. Accordingly, when the user selects pane 302 in FIG. 2K, or otherwise indicates a desire to associate the shared item of electronic content with the user's on-line sharing account, data storage system 100 will use user interface component 104 to generate a sign in screen, such as sign in screen 400 illustrated in FIG. 4A. Here, the user is prompted to enter the e-mail address of the account to which they wish to sign in, in e-mail address field 402. As shown in FIG. 4A, the user has selected field 402, and has a cursor 404 that will show the entered e-mail address. Additionally, sign in screen 400 also indicates a link or a user interface element 406 that, upon actuation, will allow the user to generate a new account with data storage system 100. Once the user has entered their e-mail address in field 402, they may click on the "next" button 408, after which the sign in screen will transition to the state shown in FIG. 4C. Here, the user will enter their password into password field 410 and select the sign in button 412, as shown in FIG. 4D. Once sign in button 410 is actuated, the data storage system, using access control component 106 will determine whether the user has properly authenticated, and if so will grant the user access to his or her account. Once such access has been granted, if the user refers back to the electronic e-mail system, and selects the same link 262 described with respect to FIG. 2F, instead of generating an access code communication to the user, the user will instead, be taken directly to the shared item of electronic content. In this way, the user is taken directly to the document because they are already signed into an account that is bound to the item of electronic content. Therefore, no more access codes and access code communications are required of the user thereby simplifying the user's subsequent access to the shared item(s) of electronic content.

Figure 5:
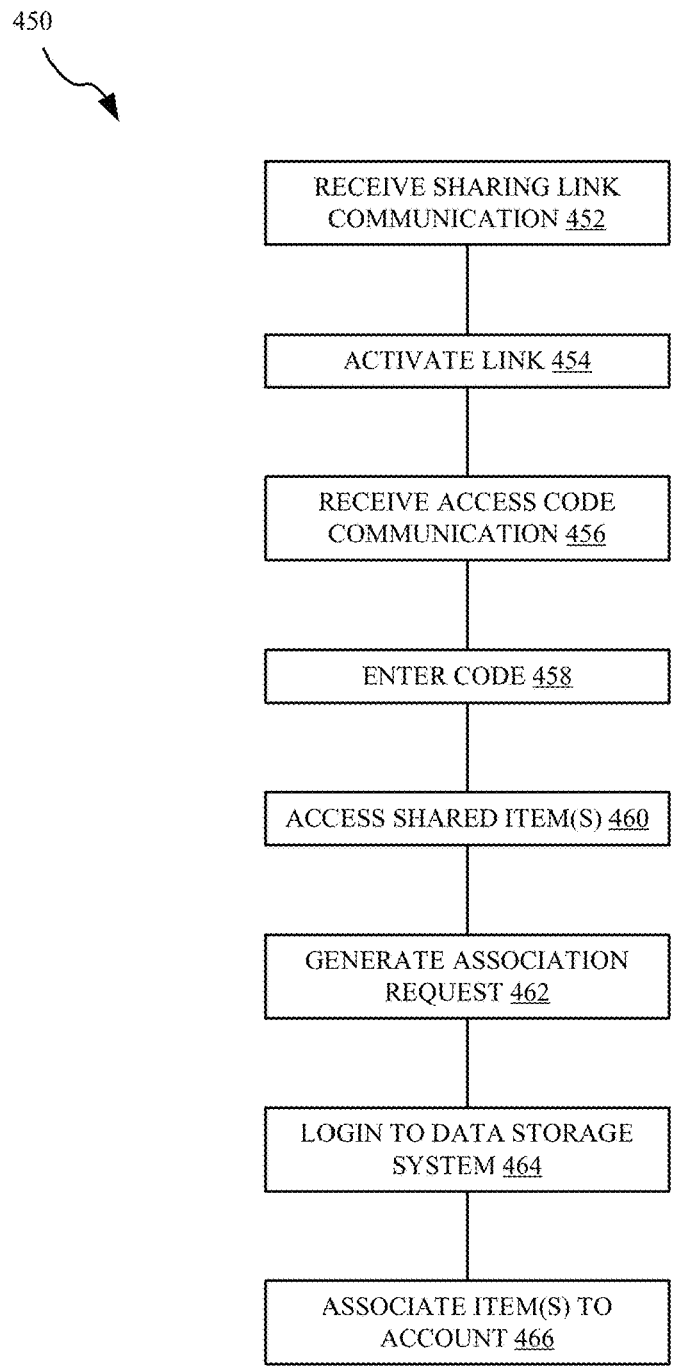
FIG. 5 is a flow diagram of a method of associating an externally shared item of content with a different organizational account in accordance with one embodiment.

FIG. 5 is a flow diagram of a method of associating an externally-shared item of electronic content with an account on a data storage system in accordance with one embodiment. Method 450 begins at block 452 where a recipient or sharee of one or more items of electronic content receives a sharing link communication, such as an e-mail. In the e-mail or other suitable communication, a link is provided that has been created by the data storage system. At block 454, the recipient of the sharing link communication clicks on or otherwise activates the link. This generates communication back to data storage system 100 which communication is indicative of the link. For example, the link may include a link identification number or code or any other suitable information that otherwise identifies the link. In response, data storage system 100 using access control module 106 and messaging component 108 generates an access code and provides the generated access code within a communication sent to the e-mail address associated with the link. In some embodiments, the time within which the access code must be entered into data storage system 100 after the initiation of the communication can be relatively short, such as five minutes. Next, at block 458, the data storage system receives the entered code via user interface component 104. If the code entered matches the code communicated at block 456, access to the shared item(s) of electronic content is granted at block 460. Next, at block 462, the sharee, or user with whom the item(s) of electronic content are shared, generates a request to associate the shared items of electronic content with another account on data storage system 100. One example of such other account is if the user has an account on data storage system 100 that is a personal account or is associated with a different group or organization that is also a tenant of data storage system 100. One reason the user may wish to do this is to take advantage of certain features and services provided by data storage system with respect to items of electronic content that are stored thereon. Regardless, once the user generates the association request at block 462, data storage system 100 presents the user with a login screen using UI component 104. The user then logs in to the data storage system as indicated by block 464. Upon successful login to the data storage system 100, block 466 executes and the item(s) of electronic content are associated with the user's authenticated account. Subsequently, if the user returns to the link communication e-mail, or otherwise selects the link while the user is logged into their account, data storage system 100 can proceed to provide the user with access directly to the item(s) of electronic content without requiring an access communication code generation step and communication of the access code to the external user. In this way, the additional security provided by the provision of an access code and communication of the access code to a known endpoint of the user can be tempered by the ability to reduce the frequency with which such operations need to be completed at least for other users who have accounts on data storage system 100.

As set forth above, description of the various embodiments generally provides the generation and utilization of a sharing link that can be permissioned to anyone in specific external organizations (rather than individual users). Moreover, a data storage system is configured to support sharing of electronic resources, such as cloud items, with only people in specific organizations without needing to know all the identities of members of those organizations.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
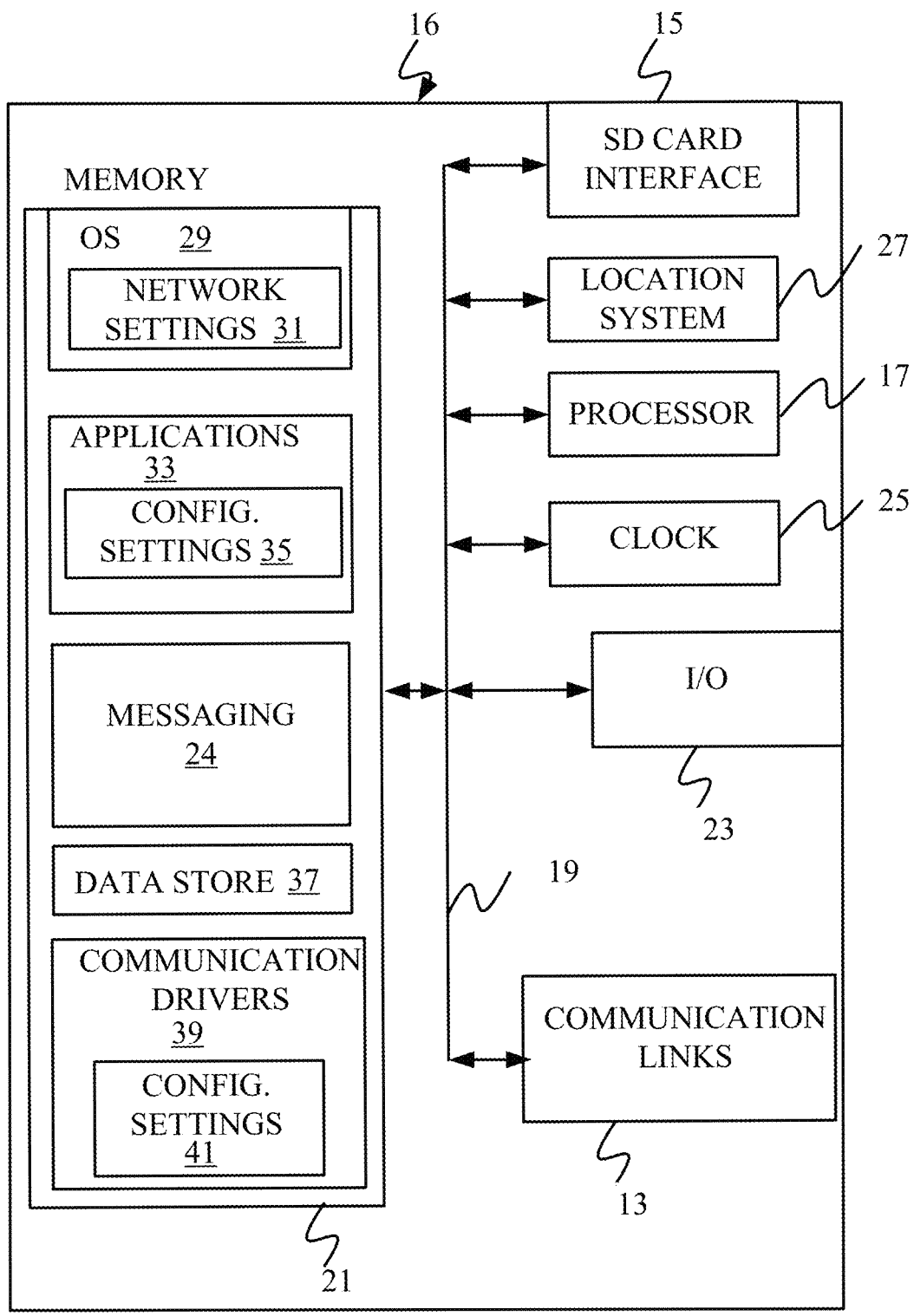
FIG. 6 provides a general block diagram of the components of a client device that can run components of the data storage system to interact with the data storage system.
Figure 7:
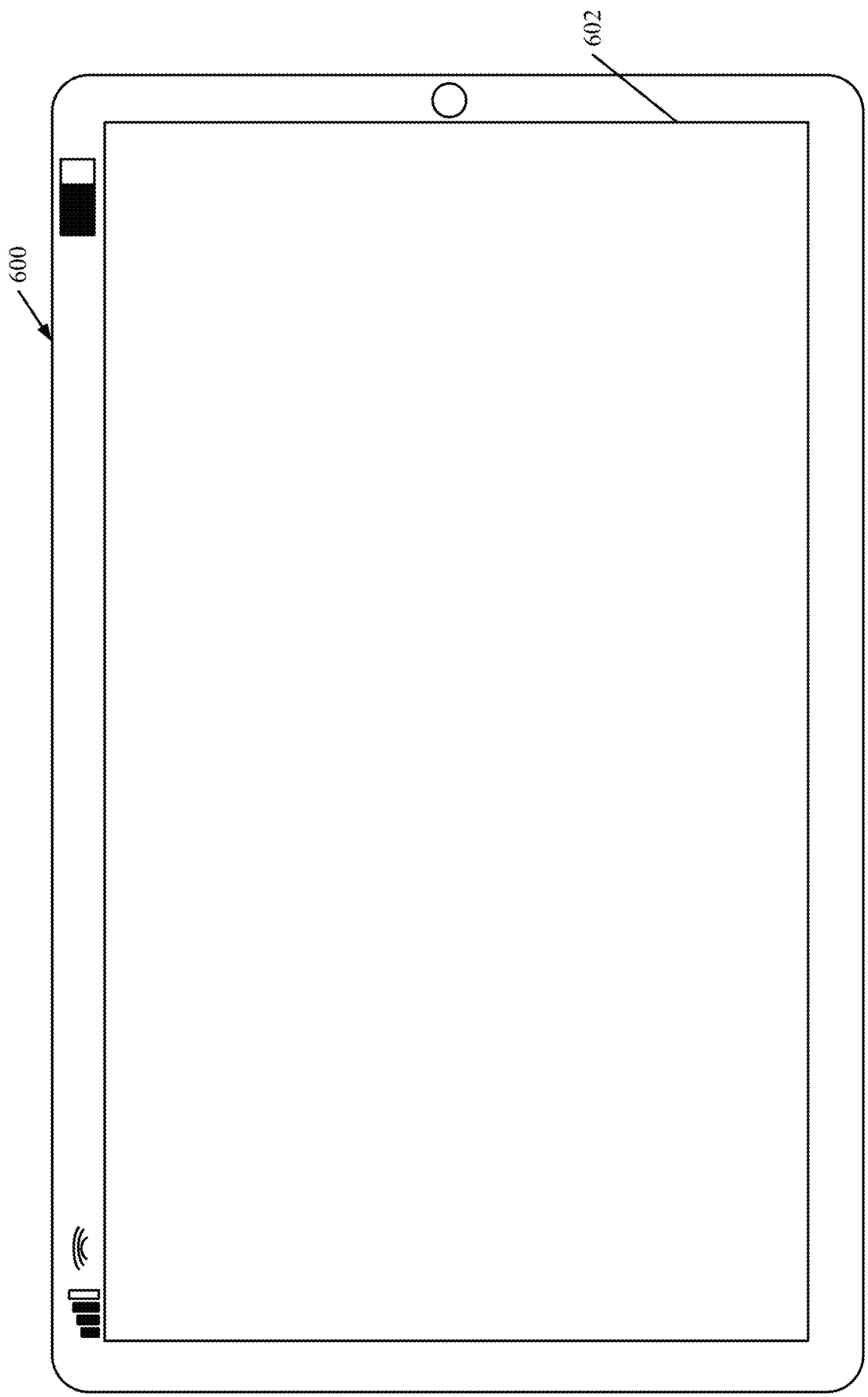
FIGS. 7 and 8 are diagrammatic views client devices that can run components of the data storage system to interact with the data storage system.
Figure 8:
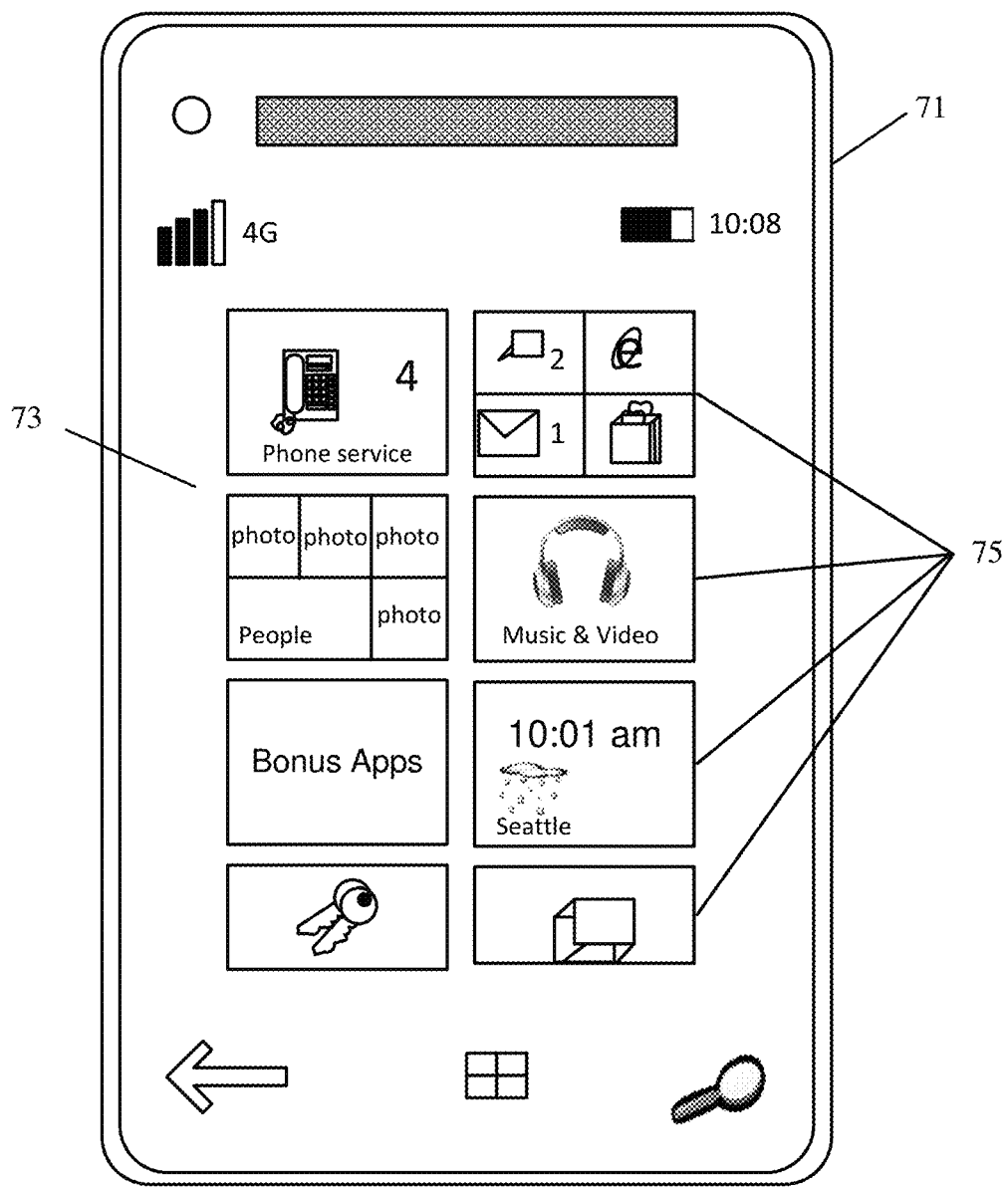

FIG. 6 is a simplified block diagram of one illustrative embodiment of a handheld or mobile computing device that can be used as a user's or client's hand held device 16, in which the present system (or parts of it) can be deployed. FIGS. 7 and 8 are examples of handheld or mobile devices.

FIG. 6 provides a general block diagram of the components of a client device 16 that can run components of data storage system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one, or more communication protocols including General Packet Radio Service (GPRS) LTE, HSPA, HSPA+ and other 3G and 4G radio protocols, 1Xrtt, and Short Message Service, which are wireless services used to provide cellular access to a network, as well as 802.11 and 802.11b (WI-FI) protocols, and BLUETOOTH protocol, which provide local wireless connections to networks.

Under other embodiments, applications or systems (like messaging application 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Memory 21 can also store messaging application 24 in order to allow the user to send and receive electronic messages. Additionally, memory 21 can also store a dedicated application that allows the user to interact with online storage system 100 through a suitable application programming interface.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 is a diagrammatic view of another mobile device in which embodiments described herein are particularly useful. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 9:
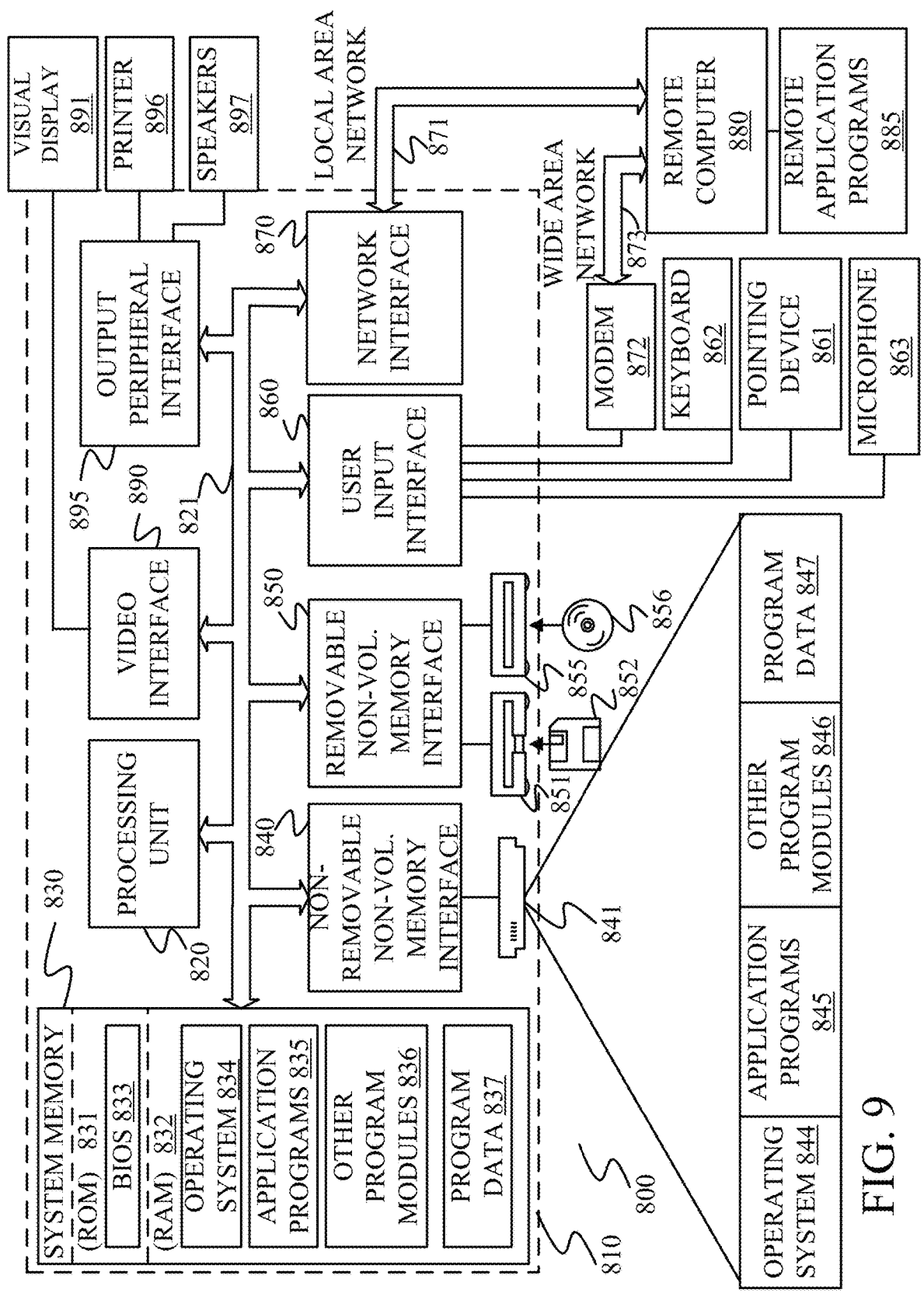
FIG. 9 is a general block diagram of a computing device that can run components of a data access system or client device that interacts with the data access system, or both.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820, system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system that includes a processor and a data store coupled to the processor. The computing system is configured to provide access to electronic content stored in the data store. A user interface component is configured to receive an indication of an external user with which to share an item of electronic content. A link generation component is configured to generate a link to share the item of electronic content. An access control component is configured to receive a request to access the item of electronic content using the link, and responsively generate an access code that is communicated to a known endpoint associated with the link. The user interface component is configured to receive a user input containing a user-entered access input. The access control component is configured to selectively grant access to the item of electronic content based on whether the user-entered access input matched the access code communicated to the known endpoint associated with the link.

Example 2 is the computing system of any or all previous examples and further comprising a messaging component configured to generate and transmit the access code to the known endpoint associated with the link.

Example 3 is the computing system of any or all previous examples wherein the messaging component is an email system.

Example 4 is the computing system of any or all previous examples wherein the known endpoint is an email address of an external user.

Example 5 is the computing system of any or all previous examples wherein the messaging component is configured to automatically generate a communication containing the link to the external user.

Example 6 is the computing system of any or all previous examples wherein the user interface component is configured to provide a link specification pane that is configured to receive permissions user input from a sharer, wherein the permissions user input defines at least one allowed activity that a recipient of the sharing link can perform relative to the item of electronic content.

Example 7 is the computing system of any or all previous examples wherein the user interface component is configured to provide a link specification pane that is configured to receive an indication of a future time after which the link will no longer function.

Example 8 is the computing system of any or all previous examples wherein the access control component is configured to determine whether a time period between transmission of the access code to the known endpoint associated with the link and receipt of the user-entered access input occurs within a predetermined period of time.

Example 9 is the computing system of any or all previous examples wherein the predetermined period of time is communicated along with the access code.

Example 10 is a computer-implemented method of externally sharing electronic content that includes receiving a request, through a network interface, to access an item of electronic content, the request being in the form of a pre-issued external sharing link being activated. An endpoint associated with the pre-issued external sharing link is identified, and a communication having an access code to the endpoint associated with the pre-issued external sharing link is responsively generated. An input response is received after generation of the communication having the access code. Access to the item of electronic content is selectively granted based on whether the input response matches the access code.

Example 11 is the computer-implemented method of any or all previous examples wherein the endpoint is an email address associated with the pre-issued external sharing link.

Example 12 is the computer-implemented method of any or all previous examples wherein the communication having the access is code is an email transmitted to the email address associated with the pre-issued external sharing link.

Example 13 is the computer-implemented method of any or all previous examples and further comprising determining whether an amount of time between generation of the communication and receiving the input response is less than a predetermined threshold.

Example 14 is the computer-implemented method of any or all previous examples wherein the method is triggered every time the pre-issued external sharing link is activated.

Example 15 is the computer-implemented method of any or all previous examples wherein generation of the communication having the access code and receiving the input response are performed by an online data storage system.

Example 16 is a computer-implemented method of externally sharing electronic content. The method includes receiving a request from an external user to access the item of electronic content via a sharing link. A predefined setting relative to external sharing is accessed to determine whether to require the external user to prove ownership of a known endpoint associated with the sharing link. A communication containing an access code is transmitted to the known endpoint based on the predefined setting. Access to the item of electronic content is selectively granted based on whether predefined setting.

Example 17 is the computer-implemented method of any or all previous examples and further comprising repeating the steps accessing the predefined setting and causing the communication to be transmitted to the known endpoint each time a request to access the item of electronic content via the link is received and wherein selectively granting access includes determining whether a correct access code is received from the external user.

Example 18 is the computer-implemented method of any or all previous examples wherein selectively granting access includes receiving the access code from the external user within a predetermined amount of time.

Example 19 is the computer-implemented method of any or all previous examples wherein the predefined setting relative to external sharing is an amount of time after the external user proves ownership of the known endpoint that subsequent requests will not require proof of ownership.

Example 20 is the computer-implemented method of any or all previous examples wherein the predefined setting relative to external sharing is a custom administrative setting.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a processor; and
memory storing instructions executable by the at least one processor, wherein the instructions, when executed, cause the computing system to:
receive an indication of an external user with which to share an item of electronic content;
generate a link to share the item of electronic content;
identify a communication endpoint associated with the external user;
receive a request to access the item of electronic content representing a first activation of the link by the external user;
in response to the request, generate an access code and transmit the access code to the communication endpoint associated with the external user;
verify user ownership of the communication endpoint based on a determination that an access input includes the access code transmitted to the communication endpoint associated with the external user;
grant first access to the item of electronic content based on:
the verification of user ownership of the communication endpoint, and
a determination that the access input is received within an expiration time associated with the access code; and
in response to a subsequent, second activation of the link by the external user,
access a predefined setting that defines a threshold amount of time after the external user proves ownership of the communication endpoint associated with the link that a subsequent request will not require verification of user ownership of the communication endpoint through additional access code communication to the external user, and
selectively grant second access to the item of electronic content, based on the threshold amount of time relative to the second activation of the link, without additional access code communication to the external user.

2. The computing system of claim 1, wherein the instructions cause the computing system to generate and transmit the access code to the communication endpoint using a messaging system.

3. The computing system of claim 2, wherein the messaging system is an email system.

4. The computing system of claim 3, wherein the communication endpoint is an email address of the external user.

5. The computing system of claim 1, wherein the instructions cause the computing system to generate a link specification display pane having a user input mechanism and, based on user actuation of the user input mechanism, define at least one allowed activity that a recipient of the link can perform relative to the item of electronic content.

6. The computing system of claim 1, wherein the instructions cause the computing system to generate a link specification display pane having a user input mechanism and, based on user actuation of the user input mechanism, define a future time after which the link will no longer function.

7. The computing system of claim 1, wherein an indication of the predetermined period of time is transmitted to the communication endpoint along with the access code.

8. The computing system of claim 1, wherein the predetermined period of time is displayed to the external user.

9. The computing system of claim 1, wherein the instructions, when executed, cause the computing system to:
generate a user interface display with a user input mechanism corresponding to the predefined setting; and
define the threshold amount of time based on user actuation of the user input mechanism.

10. The computing system of claim 9, wherein the user input mechanism comprises a set of display elements representing selectable options for the threshold amount of time.

11. A computer-implemented method comprising:
detecting a first activation of a sharing link, by a requesting user, to access an item of electronic content;
in response to detecting the first activation of the sharing link, sending a communication containing an access code to a communication endpoint associated with the requesting user;
receiving an access input in response to the communication;
verifying user ownership of the communication endpoint based on a determination that the access input includes the access code transmitted to the communication endpoint:
selectively granting first access to the item of electronic content based on:
the verification of user ownership of the communication endpoint, and
an expiration time associated with the access code; and
in response to a subsequent, second activation of the sharing link, by the requesting user, to access the item of electronic content,
accessing a predefined setting that defines a threshold amount of time after the verification of user ownership of the communication endpoint that a subsequent request to access the item of electronic content will not require proof of user ownership of the communication endpoint through additional access code communication to the requesting user; and
selectively granting second access to the item of electronic content, based on the threshold amount of time relative to the second activation of the sharing link, without additional access code communication to the requesting user.

12. The computer-implemented method of claim 11, and further comprising repeating the steps of accessing the predefined setting and sending a communication containing an access code to the communication endpoint each time a request to access the item of electronic content via activation of the sharing link is received, and wherein selectively granting access includes determining whether a correct access code is received from the requesting user.

13. The computer-implemented method of claim 11, wherein selectively granting first access includes receiving the access code from the requesting user within the expiration time.

14. The computer-implemented method of claim 13, wherein the communication containing the access, code includes an indication of the predetermined period of time.

15. The computer-implemented method of claim 11, wherein the predefined setting is a custom administrative setting.

16. The computer-implemented method of claim 11, comprising:
transmitting the access code to the communication endpoint using a messaging system.

17. The computer-implemented method of claim 16, wherein the messaging system is an email system.

18. The computer-implemented method of claim 17, wherein the communication endpoint is an email address of the requesting user.

19. The computer-implemented method of claim 11, and further comprising:
generating a user interface display with a user input mechanism corresponding to the predefined setting; and
defining the threshold amount of time based on user actuation of the user input mechanism.

20. The computer-implemented method of claim 19, wherein the user input, mechanism comprises a set of display elements representing selectable options for the threshold amount of time.

* * * * *